United States Patent
Bhat et al.

(10) Patent No.: US 11,528,362 B1
(45) Date of Patent: Dec. 13, 2022

(54) AGENT PERFORMANCE MEASUREMENT FRAMEWORK FOR MODERN-DAY CUSTOMER CONTACT CENTERS

(71) Applicant: Genpact Luxembourg S.à r.l. II, Luxembourg (LU)

(72) Inventors: Sudha Bhat, Bangalore (IN); Sayed Ali Sharafudeen, Bangalore (IN)

(73) Assignee: Genpact Luxembourg S.à r.l. II, Luxembourg (LU)

( * ) Notice: Subject to any disclaimer, the term of this patent is extended or adjusted under 35 U.S.C. 154(b) by 0 days.

(21) Appl. No.: 17/592,309

(22) Filed: Feb. 3, 2022

(51) Int. Cl.
   *H04M 3/51* (2006.01)
   *H04M 3/523* (2006.01)

(52) U.S. Cl.
   CPC .................. *H04M 3/5175* (2013.01)

(58) Field of Classification Search
   None
   See application file for complete search history.

(56) References Cited

U.S. PATENT DOCUMENTS

| | | | |
|---|---|---|---|
| 6,173,053 B1 | 1/2001 | Bogart et al. | |
| 6,542,601 B1 | 4/2003 | Hernandez et al. | |
| 6,609,083 B2 | 8/2003 | Enck et al. | |
| 6,775,378 B1 | 8/2004 | Villena et al. | |
| 7,444,263 B2 | 10/2008 | White et al. | |
| 10,997,515 B2 | 5/2021 | Khidekel et al. | |
| 2004/0249650 A1* | 12/2004 | Freedman | G06Q 30/02 705/7.29 |
| 2007/0198330 A1 | 8/2007 | Korenblit et al. | |
| 2012/0215538 A1 | 8/2012 | Cleasby et al. | |
| 2013/0129076 A1* | 5/2013 | Kannan | H04M 3/5191 379/265.09 |
| 2013/0136250 A1 | 5/2013 | Saushkin | |

* cited by examiner

*Primary Examiner* — Harry S Hong
(74) *Attorney, Agent, or Firm* — Goodwin Procter LLP

(57) ABSTRACT

A method and system for providing a data consolidation for improved customer communication and agent performance evaluation in a multi-channel contact center are provided. The method includes receiving interaction data of an agent with customers across different communication channels within the contact center, consolidating the interaction data received across the different communication channels, aggregating the consolidated data to generate a set of metrics indicative of agent performance, inputting the set of metrics into an agent performance measurement framework, and determining a performance score for the agent based on an output of the agent performance measurement framework.

20 Claims, 14 Drawing Sheets

AGENT PERFORMANCE MEASUREMENT FRAMEWORK FOR MODERN-DAY CUSTOMER CONTACT CENTERS

TECHNICAL FIELD

This disclosure relates to methods and systems for providing a data consolidation for improved customer communication and agent performance evaluation in a multi-channel contact center.

BACKGROUND

With the advancement of communication technology, customer contact centers nowadays can provide customers an opportunity to interact and engage with agents or representatives across multiple channels and devices. By nature, multi-channel interaction is customer-centric because of its ability to make navigation between communication channels easy and efficient. To provide such service, there needs to be a smooth blending between channels and queues and escalations from one channel to another, so that the customers can move from and switch between channels and still have a quality customer experience. However, most contact centers currently function as silos and are not integrated with other functions as strongly as they should be. For instance, an agent who connects with a customer in a multi-channel contact center by phone may not have any information about that customer's previous interactions on another channel. Often in a multi-channel contact center, channels are siloed, that is, agents can't see the context from interactions that customers had on other channels. Accordingly, customers need to repeat the same issue to different agents when switching between channels or even within the same channel at different time points. This siloed approach causes frustration to customers since most customers desire that businesses provide them opportunities to consistently interact and engage across multiple channels and devices seamlessly without disruption or delay. In addition, this siloed approach causes tracking of metrics and performance of agents across channels or processes to be inconsistent and time consuming due to the siloed data sources, sub-optimal data infrastructure, and lack of consolidation across data sources from different channels.

SUMMARY

To address the aforementioned shortcomings, a method and system for providing a data consolidation for improved customer communication and agent performance evaluation in a multi-channel contact center are provided. The method includes receiving interaction data of an agent with customers across different communication channels within the contact center, consolidating the interaction data received across the different communication channels, aggregating the consolidated data to generate a set of metrics indicative of agent performance, inputting the set of metrics into an agent performance measurement framework, and determining a performance score for the agent based on an output of the agent performance measurement framework.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
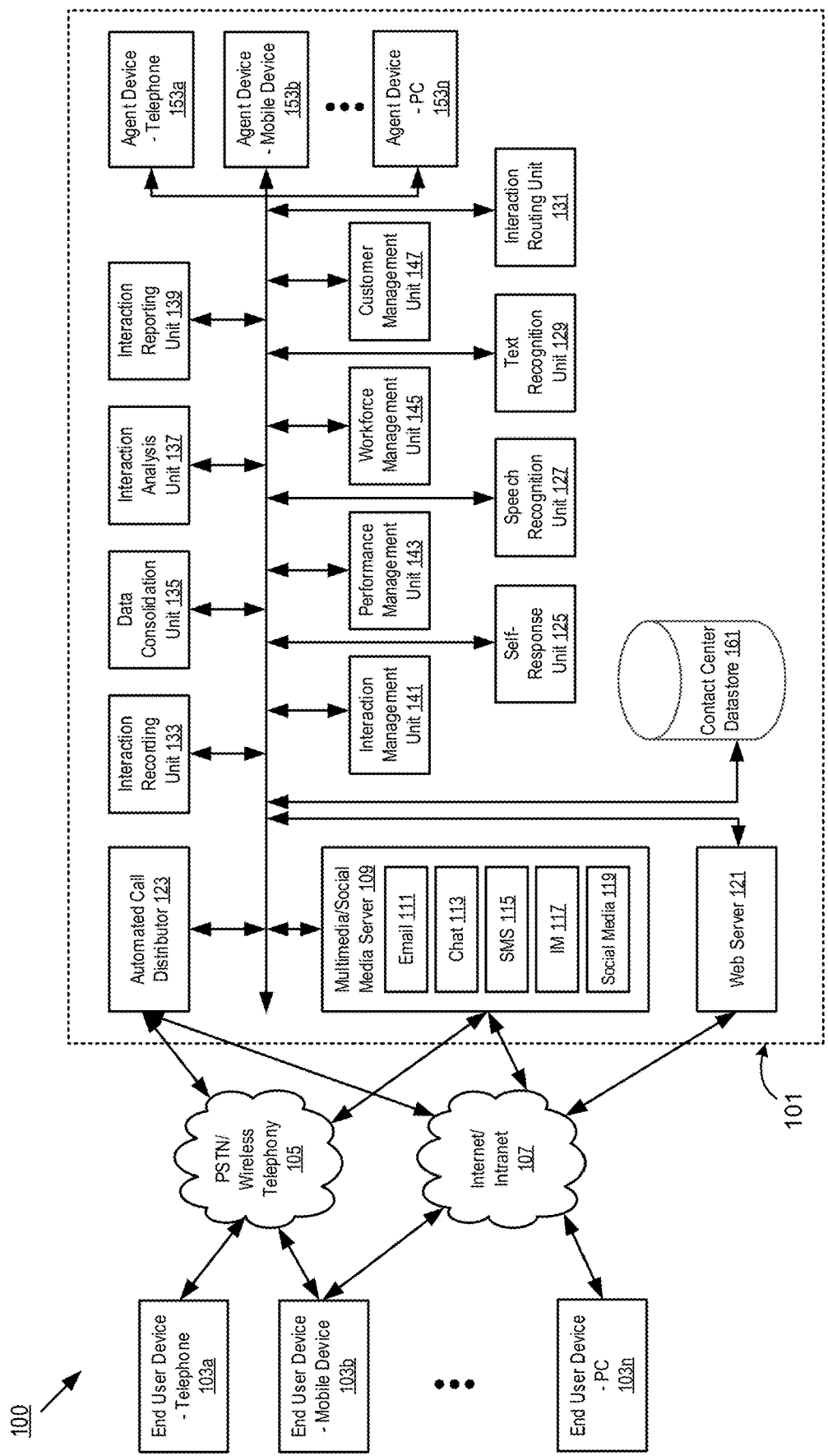
FIG. 1 is a block diagram of an example contact center system, according to embodiments of the disclosure.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to specific embodiments, examples of which are illustrated in the accompanying figures. It is to be noted that wherever practicable, similar or like reference numbers may be used in the figures to indicate similar or like functionality. The figures depict embodiments of the disclosed system (or method) for purposes of illustration only. One skilled in the art will readily recognize from the following description that alternative embodiments of the systems and methods illustrated herein may be employed without departing from the principles described herein.

The present disclosure provides technical solutions to address the technical problems of siloed data sources across different communication channels in a multi-channel contact center. The technical solutions disclosed herein may provide a contact center equipped with multiple communication channels that are connected and integrated to provide a seamless customer experience without disruption or delay. In the disclosed multi-channel contact center, information gathered through a customer's journey is not isolated between different communication channels and/or departments of an enterprise. Instead, data collected in each touch point are collated and combined to generate a personalized context for the customer, where the context may include personal information, interaction history, and many other aspects of the customer journey (e.g., order history, issue resolution, etc.) for the customer. Once generated, the personalized context may be readily available and/or automatically forwarded to any agent engaging an incoming service or sales interaction with the same customer through any communication channel. In addition, once generated, the personalized context may be consistently updated when new interactions occur between the customer and the contact center, so that there is no information missing for the customer through his journey with the contact center.

In some embodiments, the technical solutions disclosed herein may further include an agent performance measurement framework built also upon the consolidated and contextualized data. Different from the personalized customer-specific context, the contextualized data here may refer to the context generated for a specific agent. That is, every interaction with customers for that specific agent may be collated and combined to generate an agent-specific context, which may include personal information of the agent, the interaction activities (through same or different channels) of the agent within the contact center, as well as other metrics that may be generated based on the interaction activities of the agent, as further described more in detail later. Due to the data consolidation from different sources (e.g., from different channels), the as-generated agent performance measurement framework may provide a comparable quantitative structure for performance measurement of all agents across multi-channels in a multi-channel contact center.

The technical solutions disclosed herein show advantages over other existing multi-channel contact centers. First, a contact center disclosed herein allows customers to move from and switch between channels seamlessly without disruption or delay. For instance, a customer may not have to repeat themselves again when interacting with the contact center, since an agent in touch may already know who the customer is, what the customer is looking for, and/or what the customer has discussed with other agents about, etc., based on the data (e.g., customer context) already available to him. The agent in touch thus can provide faster and more targeted service to the customer, which then saves the limited resources for a generally busy contact center. For instance, the customer may not have to retype or repeat same information that s/he has previously provided, and thus save the resources used for user interactions through the communication channels or the resources used for transmitting the information by the contact center.

In addition, by consolidating data from different sources (e.g., from different communication channels and/or different departments with an enterprise), the technical solutions disclosed herein may allow a holistic view of the agent performance to be achieved during a contact center analytics reporting. By using the consolidated and contextualized agent data instead of siloed data, a clearer and more consistent agent performance measurement framework may be built and used for agent performance evaluation. The improved evaluation framework will allow better identification of improvement opportunities and coaching needs for an agent, and winning behavior from high performance agents. In some embodiments, the as-built agent performance measurement framework may even guide the interaction behavior of an agent in real-time customer communications, to allow the agent to be more customer-centric in nature in customer services.

Furthermore, since the disclosed agent performance measurement framework is built upon the data consolidated across all available communication channels, the as-built agent performance measurement framework may be applied to any contact center without communication channel constricts, not like other existing frameworks that are only applied to contact centers with specific communication channels.

The technical solutions disclosed herein, therefore, show an improvement in the functioning of computing devices, particularly those configured for the management of agent performance with a multi-channel contact center. It is to be noted that the benefits and advantages described herein are not all-inclusive, and many additional features and advantages will be apparent to one of ordinary skill in the art in view of the figures and the following descriptions.

FIG. 1 is a block diagram of an example contact center system 100 for supporting a contact center 101 in providing customer services, according to embodiments of the disclosure. The contact center 101 may be an in-house facility to a business or corporation (or collectively enterprise) for providing sales and services relative to the products and services offered by the enterprise, or may be a third-party service provider that provides services for one or more businesses or corporations. The contact center 101 may be deployed in equipment dedicated to the enterprise or third-party service provider, or may be deployed in a remote computing environment such as a private or public cloud environment with infrastructure for supporting multiple businesses or corporations and/or multiple contact centers. In some embodiments, the various components of the contact center system 100 may also be distributed across various geographic locations and not necessarily contained in a single location.

The contact center system 100 may manage resources (e.g., agents, computers, and communication equipment) to enable the delivery of services via telephone, chat, short message service (SMS), instant messaging (IM), email, web-browsing sessions or other multi-media/social media, or other communication mechanisms. Such services may vary depending on the type of contact center, and may range from customer service and ordering to help desk, emergency response, and telemarketing, among others.

Customers, potential customers, or other end users (collectively referred to as customers) desiring to receive services from the contact center 101 may initiate inbound contacts with the contact center via their end user devices, such as telephone 103a, mobile device 103b, personal computer 103n (individually or collectively referred to as end user device 103). End users may initiate and/or respond to telephone calls, emails, chats, text messaging, web-browsing sessions, and/or other multi-media/social media transactions through the end user devices 103. While telephone, mobile device, and PC are illustrated in FIG. 1 as end user devices 103, in real applications, any device that is configurable for communication with the contact center 101 is considered as an end user device 103.

In some embodiments, depending on the devices used by end users, different communication channels may be included in the contact center system 100, to enable smooth communications between the end user devices 103 and the contact center 101. For example, the communication channels between the end user devices 103 and the contact center 101 may include a private or public switched telephone network (PSTN)/wireless telephony 105, and a private or public network such as Internet/Intranet 107. Here, the PSTN may allow a conventional time-division multiplexed telephone or plain old telephony services to communicate with the contact center, and the wireless telephony may include a wireless carrier network including a code division multiple access (CDMA) network, global system for mobile communications (GSM) network, or any wireless network/ technology conventional in the art, including but not limited to 3G, 4G, long-term evolution (LTE), 5G, 6G, and the like. In addition, except the calls made through the PSTN/ wireless technology, the end user devices 103 may also include voice over interne protocol (VOIP) telephones or software-based communication means such as an instant messaging client, Skype™, email servers, and the like. It is to be noted that means are well established in the art for the contact center 101 to handle any interaction type by which customers now typically interact with the contact center 101, including but not limited to email, chat, IM, SMS, social media, and telephony of various types.

Calls made through conventional phones, mobile phones, or VOIP voice services may be received by an automated call distributor (ACD) 123 included in the contact center 101. Automated call distributor may be a specialized telephony switch that not only can terminate voice calls arriving from PSTN/wireless telephony 105 or Internet/Intranet 107, but also is equipped with special software for queuing calls, transferring calls between stations within the contact center 101 and recording call details regarding when calls arrived, where the calls were sent, and how long these calls spent at various points within the contact center 101 where they were terminated. Examples of telephony events include arrival of a call at an ACD queue, establishment of a call at an end user device 103, abandonment of a call while in queue, termination of a call at an end user device 103, and so on.

Communication types other than phone calls typically do not arrive at the ACD 123 in the contact center 101, but instead arrive at specialized software applications designed to handle interactions of a specific type. For instance, the contact center 101 may include a multimedia/social media server 109 configured to engage in certain media interactions other than voice interactions or phone calls with the end user devices 103. The media interactions may be related to email, chat, SMS, IM, other social media, and the like. In this regard, the multimedia/social media server 109 may take the form of any IP router with specialized hardware and software for receiving, processing, and forwarding multimedia/social media events. In some embodiments, the multimedia/social media server 109 may include a plurality of servers, each being configured to manage one type of multi-media/social media events. For example, multimedia/ social media server 109 may include an email server 111 configured to handle incoming emails, a chat server 113 configured to handle incoming chat sessions, an SMS server 115 configured to handle incoming SMS messages from PSTN/wireless telephony 105 or Internet/Intranet 107, an instant messaging server 117 configured to handle incoming IM sessions, and a social media interaction server 115 configured to handle inbound social media interactions. The servers 111-119 are provided for exemplary purposes, however, as there are many variations that the contact center 101 can use to receive inbound communications in these and other media types. In addition, these servers 111-119 and other similar servers not listed here are also configured to equally handle outbound interactions.

As illustrated in FIG. 1, in some embodiments, contact center 101 may include a web server 121 configured to host social interaction sites to which an end user may subscribe, such as Facebook®, Twitter®, and the like. In this regard, although in the embodiment of FIG. 1 the web servers 121 are depicted as being part of the contact center system 100, in some embodiments, web server 121 may also be provided by third parties and/or maintained outside of the contact center premise. Web server 121 may also provide web pages for an enterprise supported by the contact center. End users may browse the web pages and get information about the enterprise's products and services. The web pages may also provide a mechanism for contacting the contact center, via, for example, web chat, voice call, email, web real time communication (WebRTC), or the like.

According to embodiments of the disclosure, the contact center 101 may also include a self-response unit 125, which may also be referred to as a self-help system, virtual assistant, or the like. The self-response unit 125 may be configured to automatically interact with an end user during the user-initiated interaction with the contact center 101. The self-response unit 125 may cover a variety of communication channels including voice or call. Taking voice as an example, self-response unit 125 may be configured with a script for querying end users on their needs when receiving the calls from the end users. For example, the self-response unit 125 for managing a bank may tell callers, via the script, to "press 2" if they wish to get an account balance. If this is the case, through continued interaction with the self-response unit 125, end users may complete service without requiring to speak with a real agent or representative (e.g., a human agent). To this end, the self-response unit 125 may retrieve the information from the end user's account and automatically communicate the account balance to the end user. Here, the self-response unit 125 may use one or more speech recognition grammars to identify an action to take in response to the user's voice. For example, the self-response unit 125 may perform a match between the spoken phrase from the user and a speech recognition grammar, and perform an action associated with the grammar if there is a match. Actions associated with the speech recognition grammars may include, for example, a VoiceXML response that is dynamically generated based on the user's speech of account balance and based on stored account information of the user.

In some embodiments, even an end user ends up speaking with a real agent, a certain part of interaction may be still covered by the self-response unit 125. For example, the self-response unit 125 may also ask an open-ended question, for example, "How may I help you?" and the end user may respond with a voice reply or otherwise enter a reason for contacting the contact center 101. The customer's voice or text may then be processed or analyzed by a speech recognition unit 127 or text recognition unit 129 included in the contact center. Here, the speech recognition unit 127 and the text recognition unit 129 may be configured to perform voice/text analytics of the interactions to automatically identify words and phrases uttered or entered by the end user (and/or by agents as will be described below) during the interactions. In some embodiments, if the issues are not resolved by the self-response unit 125, the end user may be routed to an appropriate contact center resource, e.g. an agent, based on the recognized content.

In some embodiments, the contact center 101 may further include an interaction routing unit 131 configured to select an appropriate agent for routing an inbound interaction based on a predefined routing strategy (e.g., predefined call routing logic), e.g., agent availability, agent skills, agent preferences, agent levels, client information, interaction type, and certain other routing parameters. Interaction routing unit 131 may keep track of the state of readiness of each of a plurality of agents. Once a target agent is selected, instructions to route the interaction to that target agent are sent to the automated call distributor 123, multimedia/social media server 109, or web server 121, which then directs the specific interaction to the target agent, or more specifically, an agent device 153 associated with the target agent, which may be a telephone 153a, a mobile device 153b, a PC 153n, or any other device associated with the target agent. The routed interaction may be then continued between the end user and the target agent, to address concerns raised by the end user. The interaction may be a continued phone discussion, email exchange, online chatting, messaging, etc. In some embodiments, a dynamic adjustment to an interaction routing is also feasible based on the volumes, special events and agent's availability. Predominantly, agents are segregated into skill groups based on the lines of businesses they are expected to be served efficiently.

In some embodiments, the contact center 101 may also include an interaction recording unit 133 configured to record interactions between the end users and the agents, such as agent desktop activities and so on. The interactions may include phone calls or voice communications, text chats, emails, messages, and the like. In some embodiments, any touch point from an end user or from an agent may be recorded by the interaction recording unit 133, such as a tone of a phone call or voice, a question mark or an exclamation mark in a text message, a meme, emoji, or sticker in a chat, an image or video in a message, etc. In some embodiment, a survey for evaluating an ended interaction or agent may be also recorded and automatically associated with an already completed interaction between an end user and the agent. Other information and activities related to an interaction, such as notes taken by the agent during or after the interaction, further actions taken by the agent during or after the interaction, may be also recorded by the interaction recording unit 133. In some embodiments, the interactions recorded by the interaction recording unit 133 may be stored in a contact center datastore 161, which can be further retrieved for review and/or analysis.

In some embodiments, the contact center 101 may further include a data consolation unit 135 configured to consolidate data from various sources. For instance, the data consolidation unit 135 may collate and combine all contact points of a customer through his/her journey during the interactions with the contact center, and then generate a personalized context for the customer based on the collated and combined data. These contact points for the contact center may have occurred through different departments (e.g., sales, technical support, or customer service departments) within an enterprise and across different communication channels (e.g., email, online chat, phone call, etc.). The generated context may include personal information, interaction history, and other related context related to the interactions, such as order receipt, notes taken by the agents, warranty information for a purchased product, and so on. The context, once generated for a customer, may be consistently updated during the later interactions of the customer with the contact center, so that no information is missing through the journey.

In some embodiments, the data consolidation process may include an acquirement of insights of data from every communication channel. That is, the data collected from different communication channels are not just put together, but rather certain insights are obtained from each channel of communication. For instance, a summary text may be automatically generated from a phone call service (e.g., through certain speech-to-text technologies and summarization tools included in the system 100), from a messaging service, from an online service, etc. These summaries may be automatically organized for a customer based on the time of contact by the customer, so that the insights from these different channels of communication may be linked together. Making use of the insights from every communication channel may allow an agent to easily tracking the points discussed by a customer through the journey, and thus keep the customer moving along the journey smoothly.

In some embodiments, the data consolidation unit 135 may also consolidate the interaction activities of an agent throughout the services s/he provided to customers. A personalized context may be similarly generated for the agent, where the generated context may also include personal information of the agent, interaction activities of the agent, as well as other related context related to the interaction activities (e.g., surveys provided by customers for the agent). Similarly, the generated context for the agent may be also dynamically updated throughout the services provided by the agent. In some embodiments, the consolidated data for the customers and agents may be stored in the contact center database 161, and may be readily retrieved for further analysis. For instance, the stored context for a customer or an agent may be readily retrieved by identifying metrics for an agent, or by checking interaction history of a customer.

In some embodiments, the data consolidation or the generated context for a customer or an agent may be not just a data reorganization, but rather include further data parsing and analysis. For instance, voice data may be converted to text data (e.g., by collaboration with the speech recognition unit 127 and/or text recognition unit 129), and certain unstructured data may be converted to structured data. In addition, a summary or keywords may be generated and/or identified for a customer-agent interaction. Other types of data parsing and analysis may be also possible for the consolidation data (e.g., data comparison from different agents) and are not limited here.

In some embodiments, the data consolidation process may include a mapping of the relationship of data from different communication channels, to allow the data from different communication channels to be comparable. For instance, responses to same or similar inquiries/questions by a same agent using different communication channels may allow a comparison of some metrics (e.g., average handle time (AHT), first call/contact resolution (FCR), dandled conversations per login hour (HCPLH), etc.) between different communication channels. For example, based on the data comparison of a lot of agents in handing similar inquiries/questions, it may be determined that an AHT of 5 min for call-based services may equal to an AHT of 8 min for online chat-based services, an HCPLH of 10 for call-based services may equal to an HCPLH of 5 for messaging-based services, and so on. Through the mapping of the relationship of data from different communication channels and further data analysis as will be described later, a comparable quantitative structure for performance measurement of all agents across multi-channels in a multi-channel contact center may be then provided.

In some embodiments, the contact center 101 may also include an interaction analysis unit 137 configured to analyze the interactions recorded, stored, and consolidated. This may include identifying the end user/customer and agent associated with an interaction, end user waiting time of an interaction, duration of an interaction, whether a concern from the end user is addressed through the interaction, etc. In some embodiments, the interaction analysis unit 137 may also perform certain content analysis, such as sentiment analysis for an interaction based on the tones, emoji, certain keywords, and the like used in the interaction. In some embodiments, the interaction analysis unit 137 may not only analyze an interaction that is just completed but also combine it with historical information in the interaction analysis. For example, the interaction analysis unit 137 may retrieve previous interactions performed by an agent, and combine them with the just completed interaction, to generate or update a statistical report (e.g., certain trends) for the agent.

In some embodiments, the interaction analysis unit 137 may include a plurality of metrics that may be used to measure agent performance of an agent. The plurality of metrics may be generated based on the consolidation data for an agent. That is, the data from different sources (e.g., different departments, different teams, or across different communication channels) are all combined in generating the metrics for the agent. The generated metrics may include a measurement of single user interaction or an average from a plurality of interactions within a certain period (e.g., within past week, past month, past quarter, past year, or the whole service history of the agent in the contact center). In some embodiments, the plurality of metrics may be classified into different categories, as further described in detail below. In some embodiments, the metrics may be also stored within the contact center database 161, and may be readily retrievable upon request or upon certain triggers.

In some embodiments, the contact center 101 may further include an interaction reporting unit 139 configured to generate reports from data analyzed and/or aggregated by the interaction analysis unit 137. Such reports may include near real-time reports (e.g., reports after an interaction) or historical reports concerning the performance of the agents as well as the state of resources, such as average waiting time, abandonment rate, agent occupancy, and the like. The reports may be generated automatically or in response to specific requests from a requestor (e.g. agent/administrator, contact center application, and/or the like).

In some embodiments, the contact center 101 may additionally include an interaction management unit 141 configured to manage the interactions between the end users and the agents. The interaction management may include setting rules for queuing and routing interactions, setting criteria for determining whether a waiting time is too long or not, tracking or monitoring interactions to determine whether standard procedures are followed by agents in handling interactions, checking whether each concern raised by end users are resolved, etc. In some embodiments, the interaction management unit 141 may cooperate with other components included in the contact center 101 to achieve the expected functions. For instance, the interaction management unit 141 may control the context of customer to be delivered to an agent upon detection that the agent is assigned to handle an interaction initiated by the customer. This then prevents the customer from repeating certain information already reported in the past.

In some embodiments, the contact center 101 may further include a performance management unit 143 configured to manage the performance of the agents. This may include evaluating the performance of each agent and/or further ranking the agents according to their performance. To evaluate the performance of an agent, the performance management unit 143 may retrieve information from the contact center datastore 161 storing data including recorded data and analyzed data (e.g., metrics) related to the agent, and evaluate the performance according to certain criteria. For example, based on the retrieved data, the performance management unit 143 may determine one or more performance scores for the agent (e.g., an overall performance score across multiple channels, a set of performance scores for different categories or different channels). Based on the determined scores for the agents, the performance management unit 143 may then rank the agents in general or in one or more categories. In some embodiments, the determined scores for agents may be used for routing interactions. In some embodiments, the determined scores for agents may be used to determine certain training programs (e.g., coaching needs) for the agents, so that the performance of the agents can be improved.

In some embodiments, the contact center 101 may additionally include a workforce management unit 145 configured to manage the agents of the contact center 101, including setting the work schedules for the agents of the contact center in accordance with predicted demand (e.g., predicted numbers of incoming and outgoing interactions with the contact center across the different channels), in accordance with agent vacation plans, break times, and the like. The schedules generated by the workforce management unit 145 may also account for time spent by agents in meetings, training, coaching, and the like. In some embodiments, the workforce management unit 145 may also arrange the agents to handle interactions from different communication channels based on the skills and performance of the agents, such as certain performance scores for certain categories. In some embodiments, the workforce management unit 145 may be also responsible for scheduling the training and coaching sessions for the agents if necessary. By taking all factors into consideration, the workforce management unit 145 may ensure that there are always sufficient agents available to handle the interactions workload each day for each communication channel in the contact center.

In some embodiments, the contact center 101 may further include a customer management unit 147 configured to manage end users contacting the contact center. For example, the customer management unit 147 may maintain end users' preferences, notes from agents about the end users, interaction history of end users, and end user profiles. Here, the interaction history for each interaction may include the reason for the interaction, time on hold, handling time, problem resolved or not, communication channel, and so on. In addition, in some embodiments, the customer management unit 147 may also track the interactions by an end user using different communication channels to address a same issue. If such a scenario is found, the customer management unit 147 may integrate information (e.g., by collaborating with the data consolidation unit 135) obtained from different channels for the end user, and store the integrated information (e.g., customer context) in a database accessible from different communication channels by agents, so that all information related to the same issue can be quickly reviewed by the agents when interacting with the end user using different channels. In some embodiments, the integrated information or customer context may be automatically pop up for an agent when a new contact initiated by the end user is routed to the agent.

In some embodiments, the contact center 101 may further include a contact center datastore 161 configured to store one or more databases relating to agent data (e.g., context data, agent profiles, skills, performance scores, ranks, schedules, etc.), customer data (e.g., context data, customer profiles, interaction histories), interaction data (e.g., details of each interaction), and the related data (e.g., receipts, warranty, manual, interaction notes, etc.). In some embodiments, other data generated and required by the contact center, such as the surveys, analytic results, agent ranking, agent performance scores, daily schedules for different channels, training and coaching schedules, etc., may be also stored in the contact center datastore 161. In some embodiments, the contact center datastore 161 may take the form of a hard disk (e.g., a non-transitory computer-readable storage media) or disk array, and may be distributed within a same location or distributed around different locations with the contact center 101. In some embodiments, partial or full of the contact center datastore 161 may take the form of a cloud storage set up specifically for the contact center and/or provided by the third parties. In some embodiments, the contact center database 161 may include multiple databases located in local or in a distributed manner, where each database may store one or more aspects of the above-described data.

It should be noted that the above-described components in the contact center system 100 are provided for exemplary purposes and not for limitation. The disclosed contact center system may include more or fewer components than those illustrated in FIG. 1. For example, the contact center 101 may include one or more components for instructing or managing outgoing calls or communications to follow an unresolved issue for an end user. It should be also noted that, while one contact center 101 is illustrated in the figure, in some embodiments, there may be two or more contact centers included in the disclosed contact center system 100, where the two or more contact centers may each include respective components described above, or at least some of the two or more contact centers can share certain components described above. For example, some contact centers may share agent profiles and/or customer profiles. The specific functions of the components included in the contact center system 100 are described more in detail with reference to specific applications.

Figure 2:
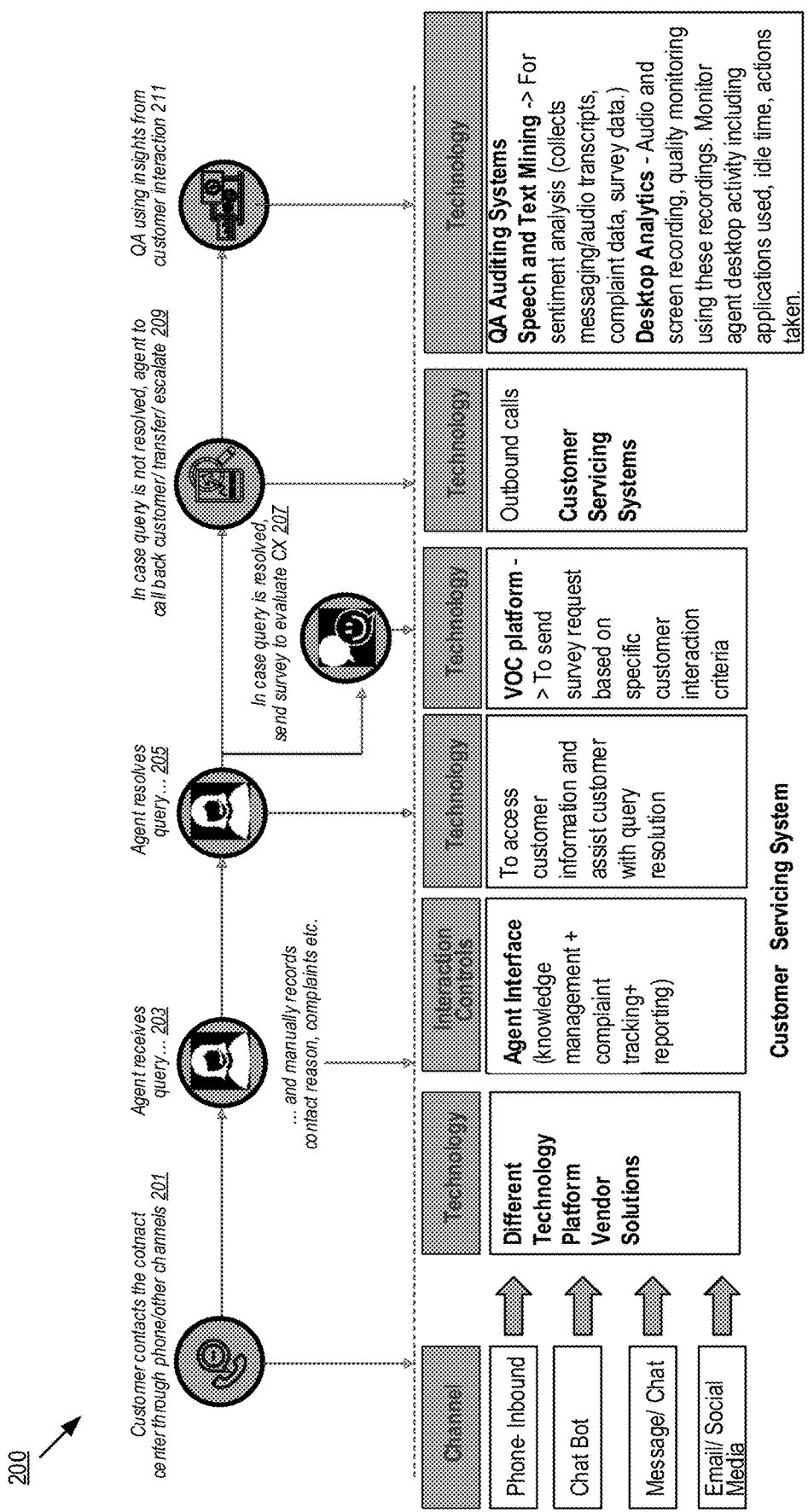
FIG. 2 is a schematic diagram of an example customer-agent interaction, according to embodiments of the disclosure.

FIG. 2 is a schematic diagram of an example interaction process 200 between a customer and an agent, according to embodiments of the disclosure.

In some embodiments, the self-response unit 125 included in the contact center 101 may resolve an issue, query, or concern raised by an end user or customer ("end user" and "customer" can be used interchangeably throughout the specification), and thus an interaction may be not necessarily routed to an agent in the center. Under many situations, however, an issue, query, or concern raised by an end user or customer may be not resolved by the self-response unit 125, and thus an interaction between the customer and an agent is required to address the issue, query, or concern raised by the customer, as further described in detail below.

In step 201, the customer may contact the contact center through phone or other communication channels. As illustrated, the other communication channels may include, but are not limited to, chat bot, message chat, email or other social media. The phone (conventional, mobile, or software phone) and other communication channels may be provided by third-party service providers and/or configured by an enterprise that the contact center serves. Accordingly, different vendor solutions may be available to set up the technology platform for communications, as illustrated in FIG. 2. In some embodiments, not all communication channels are set up for the contact center, and instead just one or a couple of communication channels are configured for the center.

In step 203, an agent receives the query from the customer. To address the query from the customer, the agent may begin by asking for customer information and the reason(s) for the contact, complaints that the customer may want to discuss, and the like. The agent may verify the customer information based on data retrieved from the customer database, or may register the customer information if there is no existing customer information. Additionally or alternatively, the customer may be automatically identified based on a phone number, an email address, and the like. For easier tracking, the agent may also manually record the collected information including the customer information, the contact reason and the complaints that the customer may have. In some embodiments, different interaction controls or tools may be included in the contact center and provided to the agent to assist with the interactions. For example, a specifically designed agent communication interface (hardware and/or software interfaces) may be provided to the agent for recording (e.g., through a voice recorder), reporting, and tracking (e.g., through keep-notes software applications).

In step 205, the agent resolves the query/issue/concern raised by the customer. As previously described, the agent may be selected according to the skills and other criteria set up by the contact center. The selected agent may thus have the knowledge to resolve the query/issue/concern raised by the customer, or may know where to locate the resources or knowledge to respond to the query/issue/concern. In some embodiments, a customer relationship management (CRM) tool may be included in the customer management unit 147 and utilized to assist with the resolution to the query/issue/concern. For example, before the customer is routed to the agent, the customer may be already asked (e.g., through the self-response unit) about the personal information (such as name, address, phone number, email, etc.) and the type of concern that the customer wants to address. Therefore, certain information (e.g., customer context) regarding the customer and knowledge regarding the query/issue/concern may be automatically popped up in front of the agent when the interaction is routed to the agent. If this is not the first contact from the customer, the interaction history from the customer may be also popped up. This may include the interaction history from all communication channels initiated by the customer regarding the topic. In some embodiments, certain notes, comments, and/or recommendations may be also included in the interaction history when it is popped up.

In step 207, the customer may be provided with a survey to evaluate the customer service provided by the agent, if the query/issue/concern is resolved through the interaction with the agent. Accordingly, the contact center may be configured to include a voice of customer (VoC) platform or may be partnered with a third-party VoC platform to send a survey to the agent after the interaction between the customer and the agent ends. The survey may be provided to the customer in different formats based on the customer interaction criteria (e.g., customer communication channel). For example, the survey may be automatically popped up in a customer user interface after an online chat, or may be sent to the customer as a link if messaging was used in the interaction. Alternatively, the survey may be a call back from the contact. The survey may be presented in a form to allow the customer to select certain options and/or provide some comments regarding the service provided by the agent.

In step 209, the agent may call back or ask the customer to call the contact center again if the query/issue/concern is not resolved. The contact center may thus include a customer servicing system configured to call back the customers that require additional actions. The customer servicing system may store customer information including the contact information so that the call-back or email back service or continued messaging can be performed. In some embodiments, solution to the query/issue/concern may be stored in the customer database (e.g., in the interaction history of the customer), which can be retrieved and provided to the customer during the call-back service. The solution may be obtained by the agent through further counseling and/or searching after the last contact with the customer. In some embodiments, if the agent cannot resolve the query/issue/concern, the case may be transferred to another agent, or may be escalated to a supervisor for additional attention, so that the query/issue/concern can be addressed in time.

In step 211, an evaluation (e.g., a quality assurance auditing process) may be further conducted to explore insights from the customer interaction. The evaluation may include certain data mining and/or data analysis. For example, a sentimental analysis may be automatically conducted based on speech and text mining. In some embodiments, a tone analyzer may be included in the contact center, which may be configured to use linguistic analysis to detect emotional and language tones, where the tone analyzer may be a machine learning (AI) model trained with a large number of customer interactions to measure customer sentiment as well as agent sentiment. Accordingly, by analyzing the messages, audio transcripts, complaint data, and survey data collected throughout the interaction, the tone analyzer may determine whether customer feedback to the service provided by the agent is positive, negative, or neutral.

It is to be noted that, in some embodiments, the tone analyzer may be even activated during the interaction between the agent and the customer so that the dialog strategy can be properly adjusted if a certain negative tone is identified during the interaction. For example, a notification of the identified negative tone may pop up and caution the agent to consider changing the response strategy. A recommended response strategy may pop up simultaneously, which may be then adopted by the agent during the interaction, thereby improving the customer experience.

In some embodiments, other types of data mining and data analysis may be also performed during the evaluation. This includes analyzing the activities taken by the agent during the interaction or during other non-call-related tasks. For example, certain desktop analytics tools may be configured to capture and analyze user activity at the desktop level, to understand how the agent interacts with the desktop environment to perform the call-related or non-call-related tasks. This may include identifying, based on the recorded audio and screen or desktop activities, the applications used by the agent during the interaction, the idle time for the agent, and actions taken by the agent when performing the tasks, and so on. The collected information may help analyze the performance of the agent related to the assigned tasks, induing the key performance indicators (KPIs) and metrics across different applications.

Aspects of the embodiments of the disclosure are not only directed to improved customer experience, but also improved agent experience. Accordingly, an improved agent performance measurement framework is further provided by the disclosure, as illustrated in FIG. 3.

Figure 3:
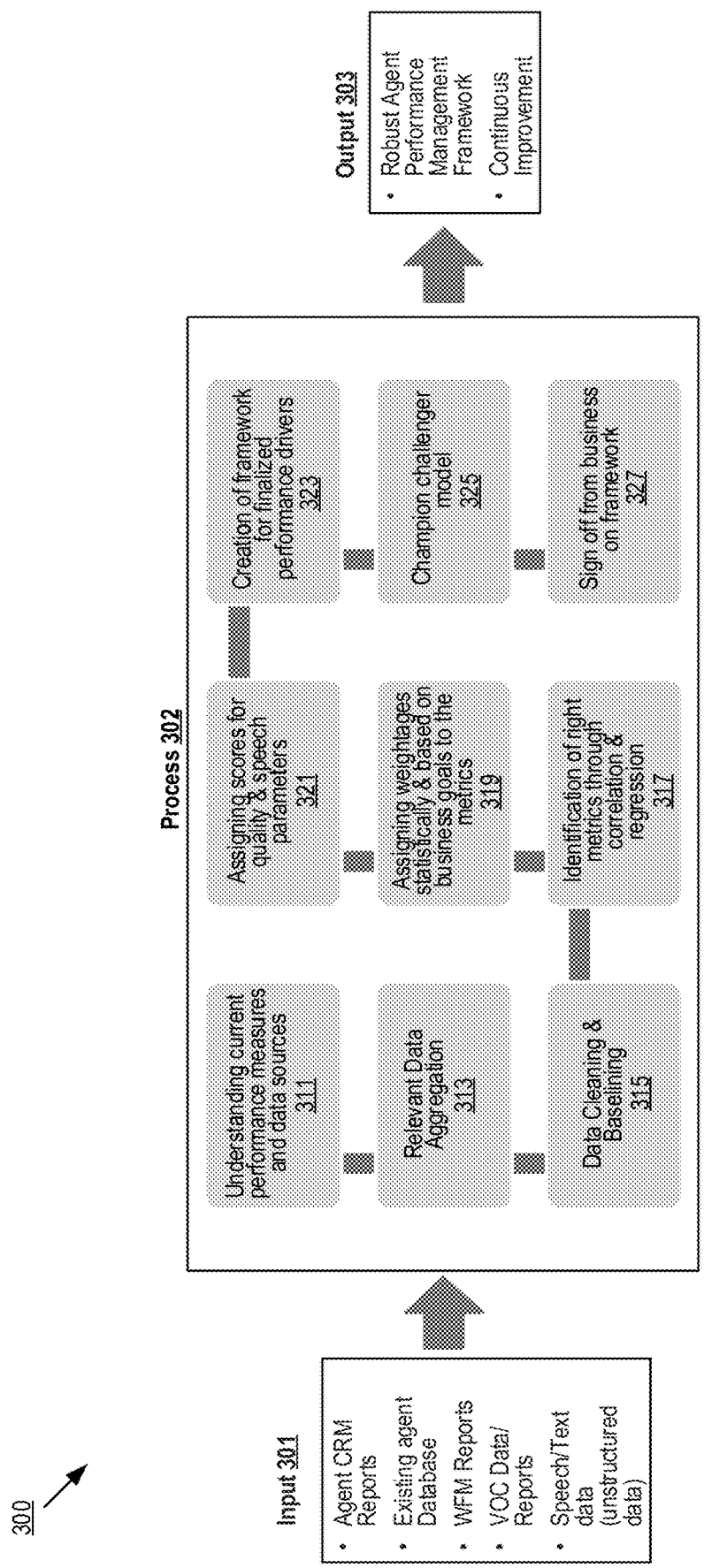
FIG. 3 is a schematic diagram of an example process for constructing an agent performance measurement framework, according to embodiments of the disclosure.

FIG. 3 is a schematic diagram of an example process 300 for constructing an agent performance measurement framework, according to embodiments of the disclosure. As illustrated, during the framework build process, certain interaction data may be used as input 301, and through a series of processes 303, a robust agent performance measurement framework may be built as an output 303, which can be used to evaluate agent performance for each agent based on the interaction data and other related data.

The input data 301 may include data from various sources that can be utilized to identify proper metrics for building the agent performance measurement framework. The data may include agent-customer relationship management (CRM) reports, existing agent database, workforce management (WFM) reports, VoC data and/or reports, and unstructured speech/text data. The specific data collection process is further described in detail in FIG. 4.

Figure 4:
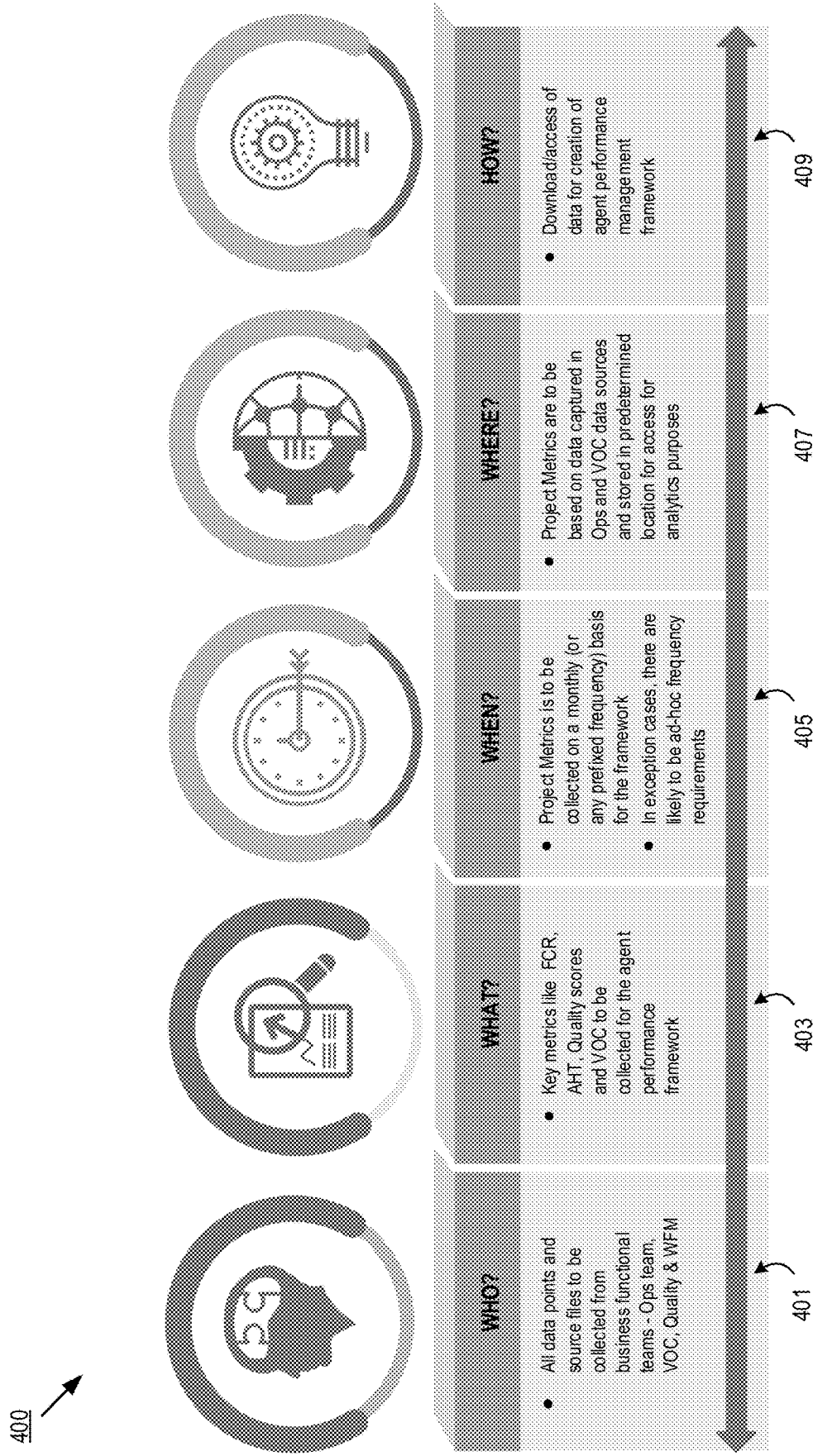
FIG. 4 is a schematic diagram of an example data collection process in a contact center, according to embodiments of the disclosure.

FIG. 4 is a schematic diagram of an example data collection process 400 in a contact center, according to embodiments of the disclosure. As illustrated, the data collection process may include four Ws and one H (who, what, when, where, how) that are basic in information gathering. Specifically, during data collection, all data points and source files may be collected from various business functional teams in a contact center, such as operations (Ops) team, VoC team, quality assurance team, workforce management team, and so on, as illustrated in block 401. It is to be noted that in the case of a blended contact center serving multiple channels like phone, messaging, chat, etc., a plethora of metrics may be collected from all of these channels for the agent performance measurement framework. Accordingly, when the metrics for evaluating agent performance are eventually identified, the metrics will come out of data that is spread across multiple systems and technologies that used in the contact center.

As further illustrated in block 403, the data collected from different sources in block 401 may include or allow to derive key metrics used for the agent performance measurement framework build, such as first call/contact resolution, average handle time, quality scores, VoC information, etc. The data may be collected on a prefixed frequency (e.g., on a daily basis, weekly basis, a monthly basis) or on-demand for certain exceptions cases, as illustrated in block 405. The collected data may be stored in a predetermined location (e.g., in contact center database 161 or other databases included therein) before being utilized, as illustrated in block 407. When necessary, the collected data may be downloaded, accessed, or retrieved from the storage for the agent performance measurement framework creation and build, as illustrated in block 409. In some embodiments, the data may be also retrieved from the storage for updating an existing agent performance measurement framework, and/or for agent performance evaluations. In some embodiments, if an agent performance measurement framework is already built, the data may be collected in real-time during the customer-agent interactions and directly fed into the existing agent performance measurement framework, which may allow real-time evaluation of agent performance of an agent during a customer-agent interaction. The real-time agent performance evaluation may provide real-time feedback (such as hints) to an agent during the customer-agent interaction, which allows improved services provided by the agent.

Referring back to FIG. 3, after data collection, a process 303 for the creation or build of the agent performance measurement framework may be further implemented, where the process may include metrics identification and creation or build of the agent performance measurement framework based on the identified metrics.

Specifically, in step 311, the process 303 may start with understanding the current performance measures and the data sources. The current performance measures may include metrics that are widely used by other contact centers to valuate agent performance. These metrics included in these current performance measures may have certain deficiencies or missing some important features(e.g., not including comparing performance across different channels), and thus require further improvements. The process 303 may thus look into the data sources (e.g., input data 301) to identify proper metrics for improved evaluation of agent performance.

In step 313, the input data 301 may be first aggregated, e.g., compiled and organized into a more consumable, more actionable and comprehensive medium. Certain data aggregation platforms, including AI and machine learning-based platforms, may be applied here to allow an automatic data aggregation of the input data 301. For example, these aggregation platforms may group interrelated data (e.g., all interactions data from a single agent) into certain subsets through data segmentation, where different subsets of data may be used to establish or determine different types of metrics. For instance, the data related to agent experience may be grouped together for identification of agent experience score, the data related to agent load may be grouped together for determining the agent load, and so on.

In step 315, the aggregated data may be further cleaned. This may include fixing or removing incorrect, corrupted, incorrectly formatted, duplicate, or incomplete data within a dataset or subset. When combining multiple data sources, there are many opportunities for data to be duplicated or mislabeled. For example, data received from different business functional teams in a contact center may have duplicated data. In addition, some data may be incorrect, incomplete, or incorrectly formatted. If data is incorrect, outcomes and algorithms are unreliable, even though they may look correct. There may be different data cleaning procedures to be used in the data cleaning process, depending on the subsets of data to be cleaned.

In some embodiments, data baselining may be further implemented in step 315. Here, the data baselining process may include a process for establishing baseline data for comparing with other data acquired afterward. This may include establishing baseline data for determining each metric used for the evaluation of agent performance. For example, based on the call interaction data for all the agents included in a contact center, the average hold time for all agents may be identified, which may be then used to evaluate agent performance.

In step 317, proper metrics for the evaluation of agent performance may be identified through data correlation and regression. Regression analysis is a related technique to assess the relationship between a response (or dependent variable) and one or more predictors (or independent variables). Here, the response may be a performance score or another type of score for agent performance evaluation, and the predictors (or independent variables) may be specific metrics for the evaluation. For example, the agent performance may be evaluated by a performance score, a knowledge score, a sentiment+quality score, and/or a VoC score. Any metrics that affect one or more of the above scores may be then considered as an identified metric for evaluation of the agent performance and may be included in an equation or algorithm for calculating the performance score(s).

Different from the regression, correlation may quantify the strength of the linear relationship between a pair of variables. For example, correlation may quantify the linear relationship between the agent behaviors and agent knowledge. Based on the quantified value, certain agent behaviors may be identified as metrics for agent performance evaluation. A specific process for identifying certain metrics is further described in detail in FIG. 5.

Figure 5:
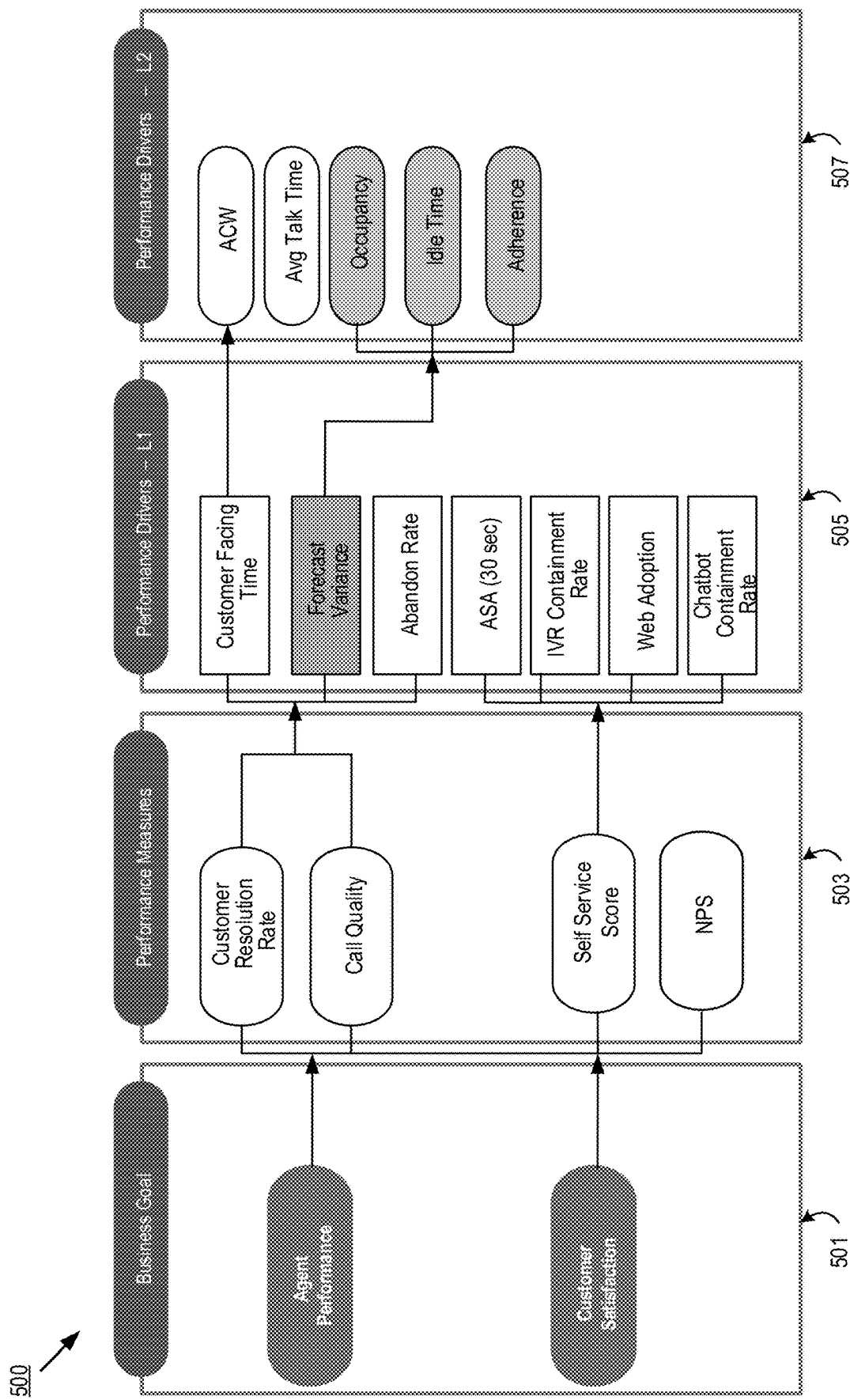
FIG. 5 is a schematic diagram of an example process for identifying certain metrics, according to embodiments of the disclosure.

FIG. 5 is a schematic diagram of an example process 500 for identifying certain metrics, according to embodiments of the disclosure. As illustrated in block 501, the response (or dependent variables) may be agent performance or customer satisfaction, and the metrics (or independent variables) may include various performance measures and their corresponding performance drivers. As illustrated in block 503, the agent performance measures may include customer resolution rate and call quality that may be used to evaluate agent performance, and the customer satisfaction measures may include the self-service score and net promoter score (NPS) that may be used to evaluate customer stratification. As illustrated in blocks 505 and 507, the customer resolution rate and call quality may be further defined by different levels of metrics, such as the first level (or L1) metrics including the customer facing time, forecast variance, and the abandon rate, and the second level (or L2) metrics including the after call work (ACW) time, average talk time, occupancy, idle time, and adherence. Similarly, the self-service score may be further defined by the L1 performance drivers including average speed of answer (ASA) (30 sec), interactive voice response (IVR) containment rate, web adoption, and chatbot containment rate.

ASA is a measure of the average speed of answer. ASA offers insight into why customers are abandoning calls. As an industry norm, wait times as long as 30 seconds are considered reasonable. Beyond that large numbers of customers are likely to abandon. IVR containment rate is the ratio of the total number of calls contained within the IVR to the total inbound calls received by the IVR. When IVR is deployed for inbound calls, it is important to create more efficiency so that some of the calls can start and finish in the IVR itself and is not handed off to a live agent. One key objective of IVR optimization is to improve the IVR containment rate. Similarly, the chatbot containment rate is the ratio of the total number of online chats within the chatbot self-assistance service to the total inbound chats received by the chatbot. One key objective of chatbot optimization is to improve the chatbot containment rate so that fewer chats are handed off to a live agent.

It is to be noted that the metrics illustrated in FIG. 5 may be not necessarily used to measure the agent performance, but rather provide an example of how metrics may be identified, e.g., by aligning the metrics to the business goals of a contact center. Accordingly, some metrics may be used to measure the performance of a contact center, but not necessarily for measuring the performance of agents included in the contact center. For example, the self-service score may be not necessarily used to measure agent performance, since these metrics are more related to the technologies applied by a contact center, and less related to the agent performance in the contact center. In addition, the metrics illustrated in FIG. 5 for measuring agent performance are not inclusive, and certain other metrics may be identified, based on the objectives and focuses of a contact center at a specific time period. Here the following are some example metrics that may be used for measuring the agent performance, which may or may be not eventually included in an agent performance measurement framework.

After-Call Work (ACW) Time: ACW time is time after interaction disconnects. Agents use this time to enter notes, select wrap-up codes, and complete any other tasks associated with the interaction. ACW is factored into the AHT.

Adherence: Adherence measures how closely agents follow or adhere to their scheduled activities. Deviation from agents' scheduled activities, which includes entered exceptions, may result in a lower adherence score. Measuring adherence will promote operational efficiency, increased productivity, reduced occupancy, lower average wait times and greater customer satisfaction. Measuring adherence will also enable a corporate, business, or contact center to more effectively plan future staffing needs based upon insight into the historical use of the agent resources.

Agent Close Rate: The percentage (%) of conversations closed by agents compared to the total number of closed conversations in the messaging channel.

Agent Experience: Agent experience is what contact center agents encounter every day as they do their jobs. It is influenced by a wide variety of factors, including training, technology, supervisors, schedules, customer interactions, company policies, and so on.

Agent Load: Agent load in the messaging channel is calculated based on the number of active conversations and inactive conversations an agent fits into his overall capacity. For example, the agent load of an agent may be calculated based on the agent's max conversation capacity and the assigned conversation capacity. If the agent load is nearing the max conversation setting, the agent may not be able to receive additional conversations.

Average Handle Time (AHT): AHT is the average amount of time agents spent on handling interactions. This calculation includes talk time, hold time, and ACW time. AHT is a metric that impacts a number of critical contact center KPIs across customer satisfaction (CSAT), operational efficiency, and agent effectiveness. It's a strong indicator of everything from the impact of agent training programs to organization processes and resources. And it's a defining metric in understanding and improving the customer experience.

Average Response Time (ART): ART on the messaging channel is the average time taken by an agent to respond to each customer message. Time may be measured from the first of consecutive messages sent by a customer. It is measured to ensure customers receive responses within an acceptable time.

ASAT (Agent Satisfaction) Score: ASAT score is a value that reflects how a customer feels about a specific interaction that s/he had with a specific agent. The ASAT score is calculated from survey platform VoC survey data. Agent satisfaction is a leading indicator that influences many other customer service indicators. ASAT score can be used to capture the sentiments of a customer at any given moment on the experience that s/he had during the interaction with the agent.

Average hold time (AHLDT): AHLDT is a contact center metric that measures the average length of time agents put callers on hold during a customer call. While, sometimes, a caller must be placed on hold so that an agent can retrieve information and/or speak with a supervisor, high values for this metric indicate inefficiencies within contact center systems and procedures and/or poor agent training. Excessive hold times can, as a result, lead to bloated average handle times, poor agent performance rates, and sub-par customer satisfaction.

Average talk time (ATT): ATT is the average amount of time that an agent spends in handling customer calls and resolving their queries. This KPI measures the productivity and efficiency of the agents and call handling practices. A high value for this metric can indicate poor in-call processes for account verification or problem definition, as well as inadequate agent training, which can lead to higher average handle times and sub-par customer satisfaction.

Case/Call Disposition: Call disposition codes are labels applied to call records in a contact center to categorize or describe a call. These codes enable the contact center agents to indicate certain information about the disposed calls, such as the reason for the call, the type of the call, and so on.

Customer Effort Score (CES): CES is a measurement of how much work a customer had to put into a recent interaction with a business/function. The score is calculated from survey platform VoC survey data. In the context of customer service, the CES measures the amount of effort a customer had to expend to get an issue resolved or a question answered. Things like being transferred to multiple agents, having to repeat information, and having to switch channels will increase effort, and therefore likely lower a business's customer effort score.

CSAT score: CSAT score or customer satisfaction score is a measurement that is based on customer feedback (e.g., survey platform VoC surveys). Basically, the CSAT score measures the percentage of customers that are satisfied (or very satisfied) with the provided services. The higher the percentage of positive customer feedback, the better the CSAT score.

Desktop Productivity Analytics (DPA) Score: DPA score (e.g., a Verint® platform-based productivity score) helps contact center team leaders understand how agents are spending their time by analyzing real-time desktop activity. The score can be used to improve operational efficiency and customer experience by ensuring processing consistency and compliance, increasing processing speed, improving quality, and reducing rework.

First Call/Contact Resolution (FCR): FCR is the percentage of calls that do not require any further contact to address a customer's reason for calling. That is, the customer does not need to contact the contact center again to seek resolution, nor does anyone within the organization need to follow up with the customer. The primary benefit to tracking FCR is the ability to identify issues that lower FCR rates, and then resolve them. Fewer issues mean better FCR rates and, at the end of the day, improved FCR means happier customers. In addition to customer satisfaction, improving contact center FCR is directly related to improved agent performance, and therefore increased efficiency and business performance.

Handled Conversations Per Login Hour (HCPLH): Handled conversations are the number of conversations in which an agent has sent at least one message on the messaging channel during the selected timeframe (e.g., per login hour).

Meaningful Conversation Score (MCS): MCS is a messaging channel metric that is an automatic, unbiased method to measure the relationship between customers and agents. The MCS evaluates and measures the overall customer relationship, solving a major issue inherent in other customer satisfaction measurements. MCS does not rely on customers answering surveys, but rather on a deep analysis of the tone, content, and sentiment of customers' actual conversations with the agent in real-time.

Net Promoter Score (NPS): NPS is a commonly used tool for assessing customer loyalty. There are two types of NPS: transactional and relationship. Transactional NPS is taken immediately after an interaction with a company and is used mostly as an assessment of that particular interaction (done through Survey Platform VoC surveys). Relationship NPS is taken at regular intervals to assess the overall state of the customer-company relationship. When used correctly, NPS can tell how well the agents are performing, on which channels the agents excel, how often the agents resolve issues, and if customers are satisfied with their experience.

Contact centers that utilize NPS as part of their strategic QA framework recognize increased return-on-investment and stay ahead of the competition. The key is how well to implement and improve NPS.

Quality Assurance (QA) Score: A QA score measures and evaluates agent soft skills and performance during a customer interaction. By consistently analyzing each interaction in near-real-time, a more holistic picture of the agent's performance over time may be obtained. In addition, consistently analyzing each interaction in near-real-time also ensures transparency across the business.

Repeat Contact Rate (RCR) 1 Hour: RCR 1 hour in messaging channel is the percentage of closed conversations where the same CustomerID opened a subsequent conversation within 1 hour. This metric helps in analyzing the agent performance with respect to their ability in resolving the customer query/problem in the very first interaction. The lower the RCR, the better it is. To improve this metric, it needs to find out why customer issues remain unresolved even after the first chat.

Service Level Agreement (SLA): SLA is a contact center's promise of maintaining a certain standard of service to the clients and customers. In one example, SLA may specify that the contact center is committed to answering a set percentage of calls within a certain number of seconds, such as answering 75% of calls within 20 seconds or resolving 80% of issues in less than a day, etc.

Transfer Rate: Transfer rate is a metric that measures the number of times a call was transferred from one agent to another as a percentage of the total number of calls. Quite often, an agent encounters an issue which he thinks may be better resolved by another agent and thus he transfers the call. In one example, after connecting with the customer, an agent listens to his/her query. When the agent realizes that the issue can be better resolved if the customer is transferred to another agent or department, the agent may transfer the call to the corresponding party. The agent may also transfer a call as per the caller's request, e.g., asking to speak to a senior member or manager. The agent can also transfer a call due to the inability of the agent to resolve the issue. Call transfers are considered to affect the contact center's performance and reputation adversely. Therefore, most contact centers try to avoid transfers and reduce the transfer rate.

It is to be noted that the above-described metrics are provided for exemplary purposes only, and many other metrics for agent performance evaluation are also possible and contemplated. In addition, while some specific communication channels (e.g., messaging or phone) are discussed in the above metrics, the other communication channels (e.g., email, social media, chat) may be also included in such metrics, to provide a similar evaluation of agent performance. In addition, different contact centers may have a different set of metrics for the evaluation of agent performance, depending on the objectives and focus of the contact centers at different periods.

Referring back to FIG. 3, in step 319, weights may be statistically assigned to the identified metrics based on the business goals. In some embodiments, different contact centers may have different focuses, represent different businesses, serve different categories of customers, and thus may have different business goals. Based on the different goals, the identified metrics may be ranked for their significance in achieving the goals. Weights may be then assigned to the metrics based on the significance. For instance, some contact centers may be focused more on quality due to the businesses they serve or represent, while other contact centers may be focused more on efficiency. Accordingly, different weights may be assigned to the identified metrics due to the different businesses goals of these contact centers.

In step 321, scores may be also assigned for quality and speech parameters. Here, the quality may be determined based on customer satisfaction, feedback from a survey, etc. The speech parameters may be determined based on the keywords, tones, and the like that can be identified from the speech. In some embodiments, by assigning scores to the quality and speech parameters, both the quantitative and qualitative measurements may be applied in evaluating agent performance.

In step 323, finalized performance drivers may be utilized to create the framework for evaluating agent performance. Here, the performance drivers may include identified metrics and the quality and speech parameters, as well as other possible factors that may affect agent performance. The built framework may be an equation that includes identified metrics and quality and speech parameters as independent variables. In some embodiments, if multiple different performance scores are used to evaluate agent performance, there may be multiple different equations included in the created agent performance measurement framework.

In step 325, the created framework may be further subject to a champion challenger model that allows different approaches to testing predictive models in a production environment. The champion challenger model enables monitoring and measuring predictions using different variations of the same decision logic. In this aspect, the disclosed framework is a scalable model that allows to incorporate new or edit existing metrics based on business needs. For instance, if over a period there are changes made to the processes and a need arises to relook at the metrics, then the disclosed process 300 makes provision to edit, change or remove them to accommodate a comparable measurement. In addition, the framework not only focuses on processes but can also support shifts in channel strategies, thereby making the framework suitable for blended environments as well. The overall goal is to identify which variation is the most successful. With respect to the created agent performance measurement framework, it is to identify metrics that can be used to most accurately evaluate agent performance. It may include a process to recreate new agent performance measurement frameworks with different metrics and/or assigned weights (which may be called challengers), which compete against each other and/or the originally created framework, to allow a champion framework to be selected.

It is to be noted that step 325 may be a dynamic process that may be frequently (e.g., every few months) performed after the creation of the original agent performance measurement framework, so that the champion framework may be frequently updated, to reflect the objective change and other possible changes that may affect the performance of the agent performance measurement framework. Accordingly, a robust agent performance measurement framework may be obtained through continuous improvement, as illustrated in the output 303.

In step 327, the created/updated agent performance measurement framework may be signed off for implementation, e.g., may be applied to the actual evaluation of agent performance. For instance, such framework may be applied to extract maximum value from a contact center KPI data, e.g., to allow managers to view KPIs regularly and identify actionable insights, e.g., identify coaching needs for agents to seek out training that best suits their needs and craft training based on their successful performances across metrics. Another benefit of the framework is its capacity to track an agent's performance over a period that makes it easy for managers to meet agents and create an action plan with milestones that are to be met. Citing specific instances that are data backed by the framework, QAs can also provide supervisors direct notes for agents supported with additional resources, thereby allowing supervisors to convey feedback more clearly to agents. Other benefits and advantages of the disclosed framework will become more obvious in view of its specific applications, as further described more in detail below.

Figure 6:
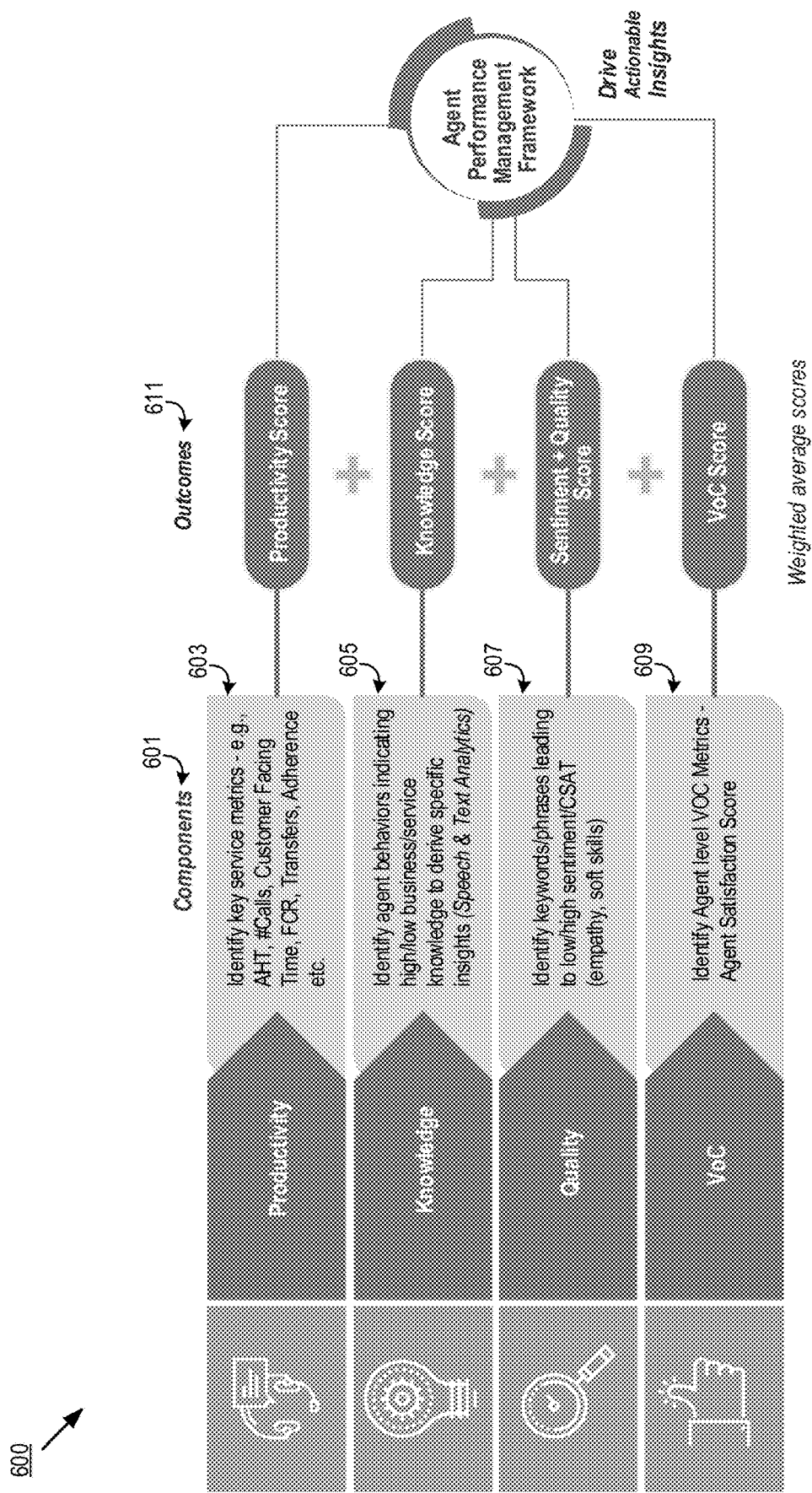
FIG. 6 is a schematic diagram of an example process for determining an agent performance score, according to embodiments of the disclosure.

FIG. 6 is a schematic diagram of an example process 600 for determining an agent performance score, according to embodiments of the disclosure. The agent performance measurement framework may be created through the process 300. The process 600 may include identifying specific components or metrics 601 that may be used to determine agent performance scores, and then feed agent-specific data corresponding to these components or metrics into the agent performance measurement framework. The outcome 603 from the agent performance measurement framework may include certain score(s) representing the performance of an agent in customer services.

As illustrated in FIG. 6, the process of determining the overall performance score of an agent may include determining specific scores for certain categories and then determining an overall score for the agent based on the determining scores for these categories. For instance, the process 600 may include determining components or metrics for determining productivity score, knowledge score, sentiment+quality score, and VoC score, and then determining the overall score for that agent. To determine the productivity score, the process 600 may include step 603 to identify key service metrics, including but are not limited to AHT, number of calls, customer facing time, FCR, transfers, adherence. To determine the knowledge score, the process 600 may include step 605 to identify agent behaviors indicating high or low business service knowledge to derive specific insights during agent-customer interactions. Certain speech and text analytical tools may be applied to identify insightful agent behaviors. To determine the sentiment+quality score, the process 600 may include step 607 to identify keywords or phrases leading to low or high sentiment or CSAT score. Such keywords may include empathy words or other sentimental words indicating soft skills for an agent. To determine the VoC score, the process 600 may include step 609 to identify agent level VoC metrics such as agent satisfaction score. In one example, the agent satisfaction score may be determined based on feedback (e.g., a survey) from a customer after an agent-customer interaction.

In some embodiments, each of the above-determined productivity score, knowledge score, sentiment+quality score, and the VoC score determined by the agent performance measurement framework may be an average score for an agent based on a plurality of agent interactions. In some embodiments, each average score may be also a weighted score that is weighted based on the focus and objective of the contact center, among other possible factors. In some embodiments, the agent performance measurement framework may also provide an overall performance score for the agent, e.g., by adding the weighted productivity score, knowledge score, sentiment+quality score, and VoC score together.

As can be seen above, the agent performance measurement framework is a mechanism that aggregates a critical set of metrics that are indicative of agent performance and combines them into a single, all-inclusive measure of agent performance. In the framework, a focused approach is employed by bringing together efficiency and effectiveness metrics of agent performance to derive a more balanced outcome measure. In addition, categories of metrics like productivity, sentiment+quality, agent knowledge, and VoC are all taken into consideration in the framework. This approach ensures that values from a spectrum of KPI data (e.g., data from across channels) are extracted, to drive actionable insights and trends. These actionable insights or trends may help identify opportunities at the agent level and/or enterprise level to drive the reduction in cost and improvement in operational efficiency without compromising on agent behavioral qualities, e.g., through more targeted coaching and adoption of winning behaviors. The identified metrics and performance scores for agents and the corresponding trends and the actionable insights driven by these metrics and performance scores are further described in detail below in FIGS. 7A-8B.

Figure 7A:
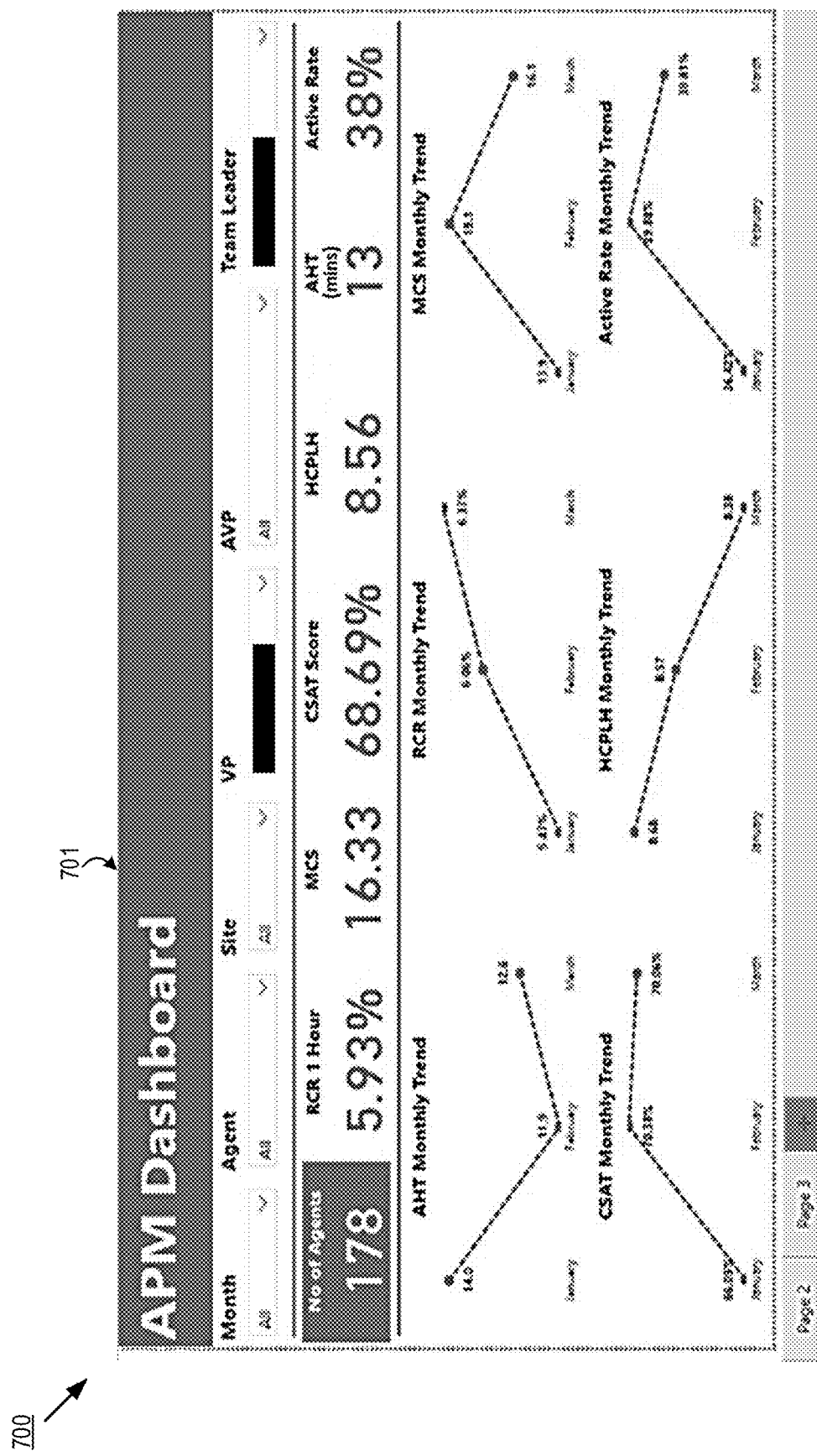
FIGS. 7A-7D illustrate example snapshots from user interfaces for monitoring metrics regarding agent performance, according to embodiments of the disclosure.

FIG. 7A illustrates an example snapshot 700 of a user interface 701 for monitoring metrics regarding agent performance, according to embodiments of the disclosure. The user interface may be an agent performance management (APM) dashboard. As illustrated, the contact center currently has a total of 178 agents, and the current enterprise-level RCR (1 hour) is 5.93%, MCS is 16.33, the CSAT score is 68.69%, HCPLH is 8.56, AHT is 13 min, and the active rate is 38%. Here, the active rate equals the number of active chat/messaging sessions of an agent per total number of sessions for that agent. As also illustrated in the dashboard, the enterprise-level monthly trends for the past three months for certain metrics may be also identified by the agent performance measurement framework and displayed in the dashboard. These monthly trends may include AHT monthly trend, RCR month trend, MCS monthly trend, CSAT monthly trend, HCPLH monthly trend, and active rate monthly trend. As indicated by the dotted lines representing these trends, some metrics (e.g., RCR, HCPLH) may become worsening during the past three months and require improvements at the enterprise level.

Figure 7B:
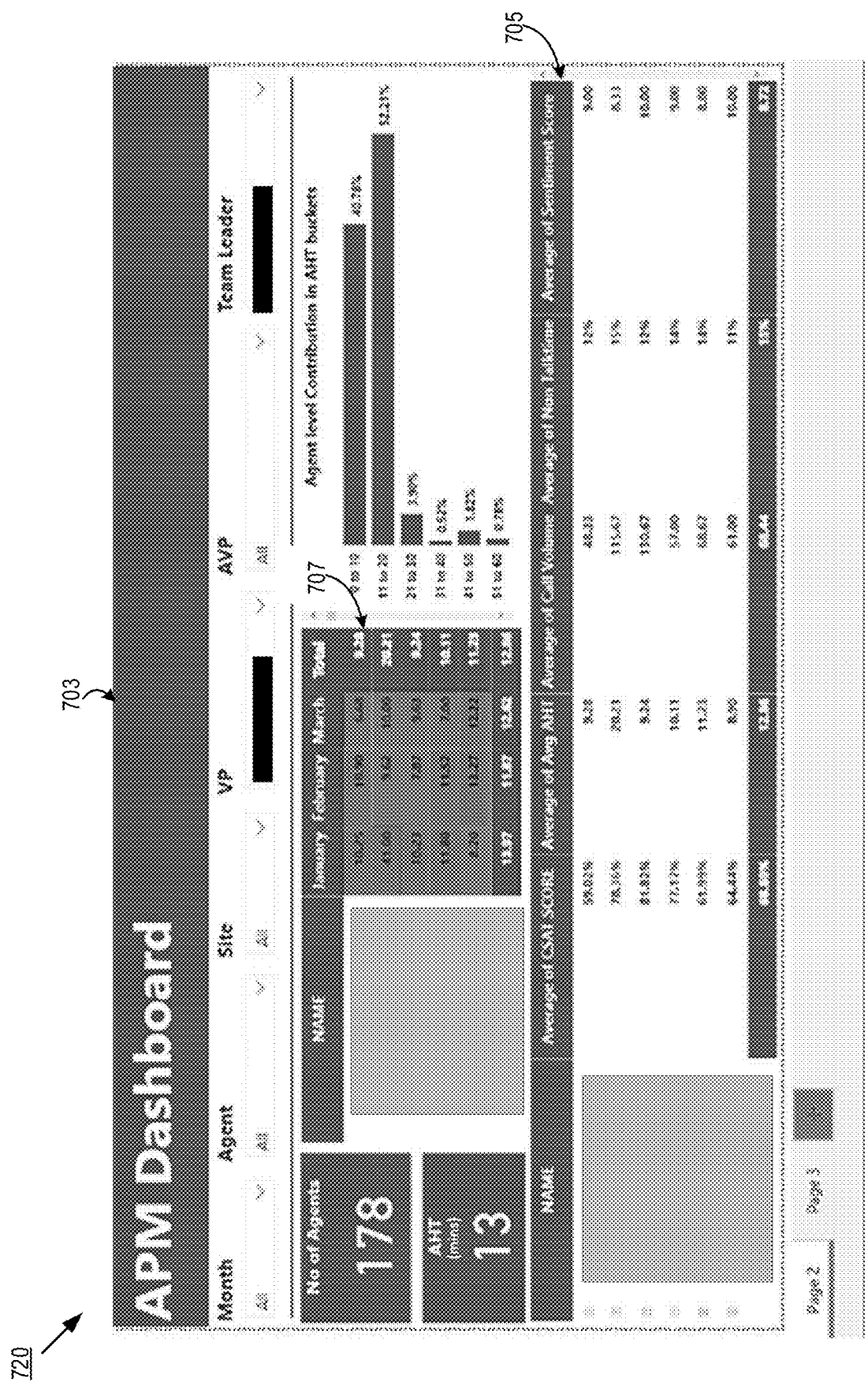

FIG. 7B illustrate another example snapshot 720 of a user interface 703 for monitoring metrics regarding agent performance, according to embodiments of the disclosure. The user interface 703 is another APM dashboard. In the dashboard, certain metrics for each agent may be further provided as a table format, as shown by table 705 (the names of the agents are intentionally blocked). These metrics may include an average of CSAT score, an average of average AHT, an average of call volume, an average of non-talk time, an average of sentiment score. In addition, for a specific metric (e.g., AHT), the data for the past three months are also available for display, as shown by table 707.

Figure 7C:
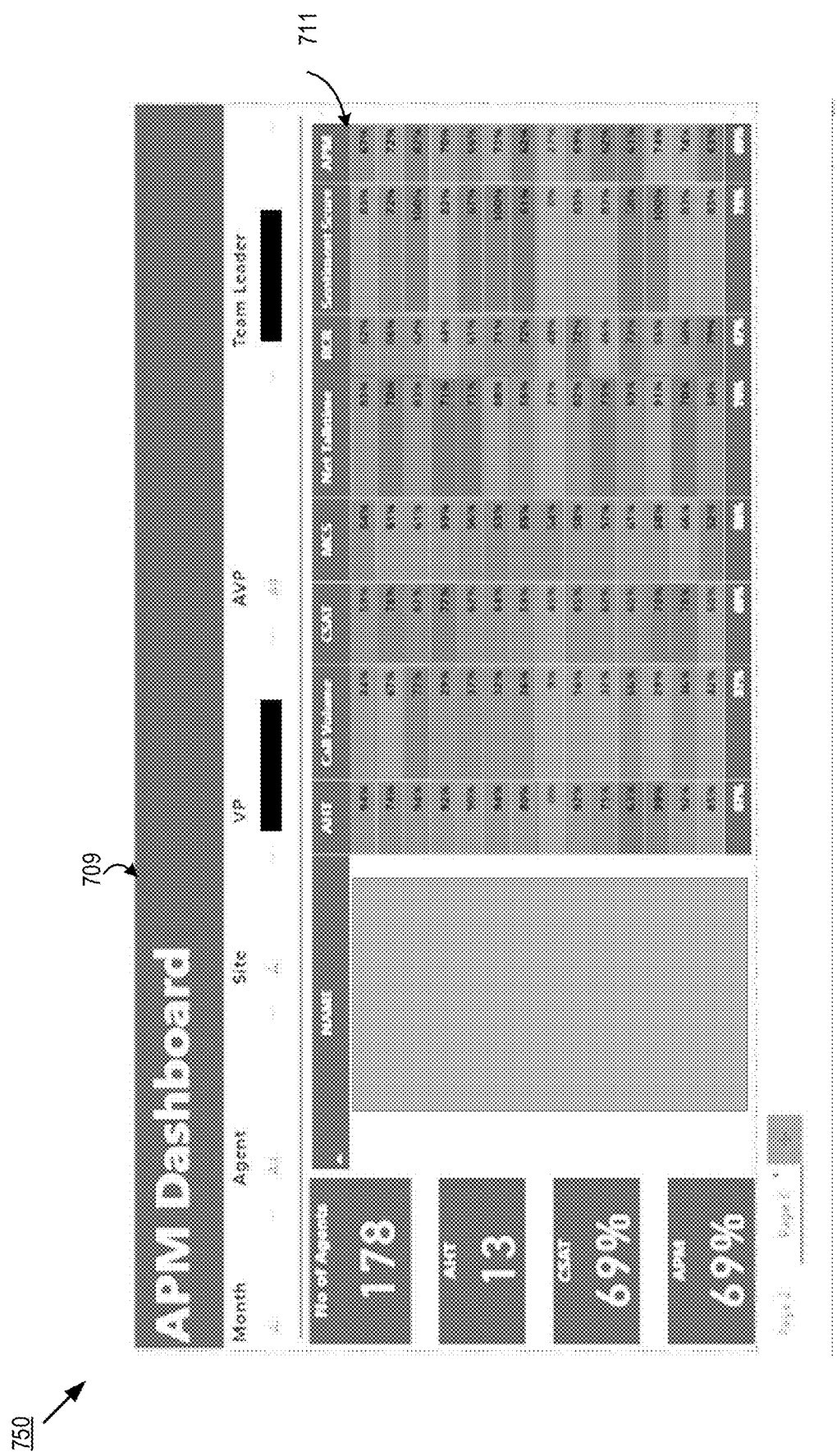

FIG. 7C illustrates another example snapshot 750 of a user interface 709 for monitoring metrics regarding agent performance, according to embodiments of the disclosure. The user interface 709 is another APM dashboard. As illustrated, the dashboard may further display the various metrics for each agent and an overall AMP score for each agent, as shown by table 711. The specific metrics may include AHT, call volume, CSAT, MCS, Net Talktime, RCR, sentiment score. The name of these agents are not shown, and the agents are not ranked according to APM scores, as shown in the table.

Figure 7D:
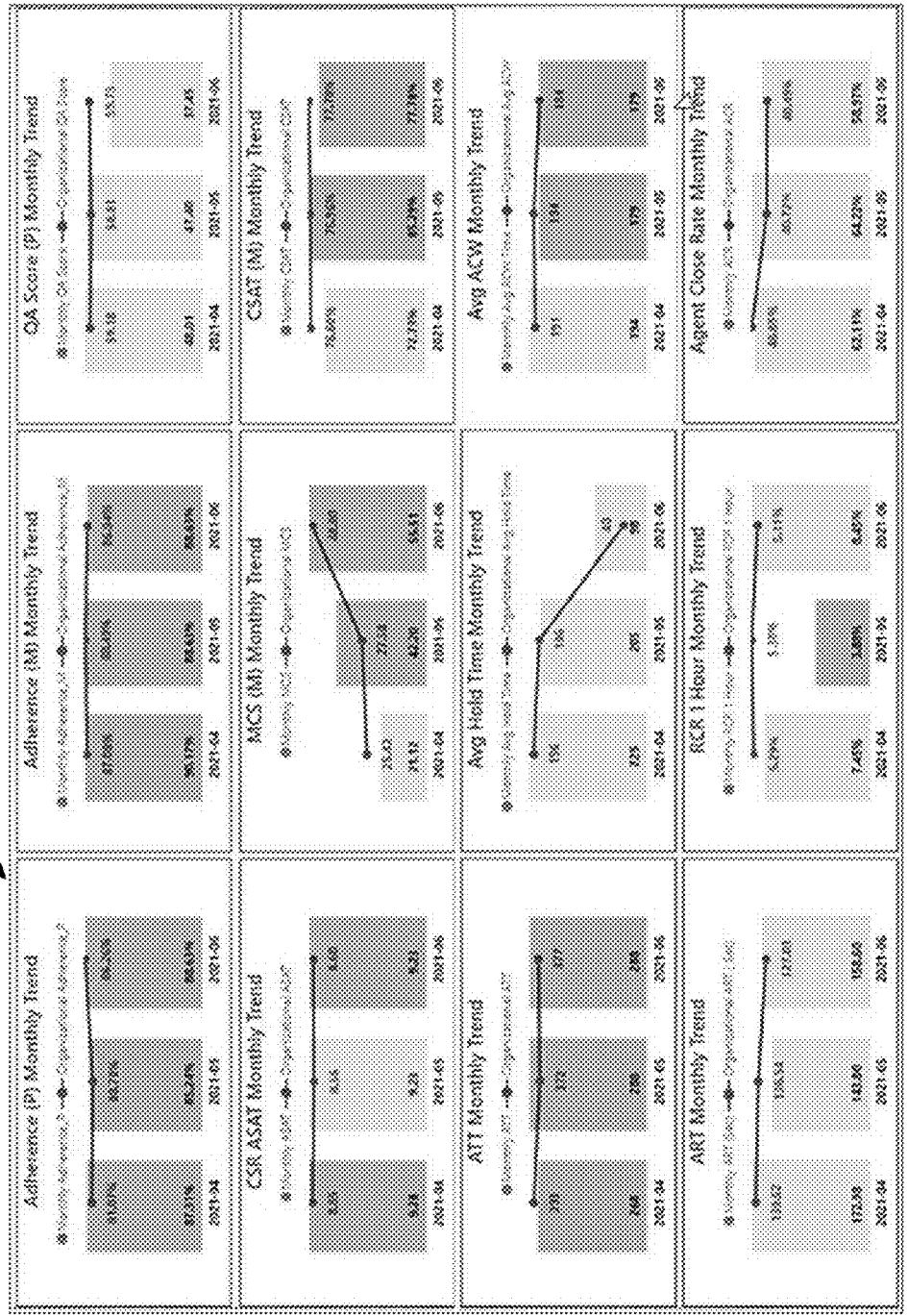

FIG. 7D illustrates another example snapshot 770 of a user interface 713 for monitoring metrics regarding agent performance, according to embodiments of the disclosure. The user interface 713 is another APM dashboard (not specified in the figure). As illustrated, the dashboard may further display trends for the metrics associated with an agent. From the trends, it can be determined whether the agent has certain metrics improved or worsened.

It is to be noted that the user interfaces illustrated in the figures are for exemplary purposes. In real applications, there may be many other user interfaces for monitoring or checking the agent performance of the agents included in a contact center. In addition, these agents are not ranked in these user interfaces.

Figure 8A:
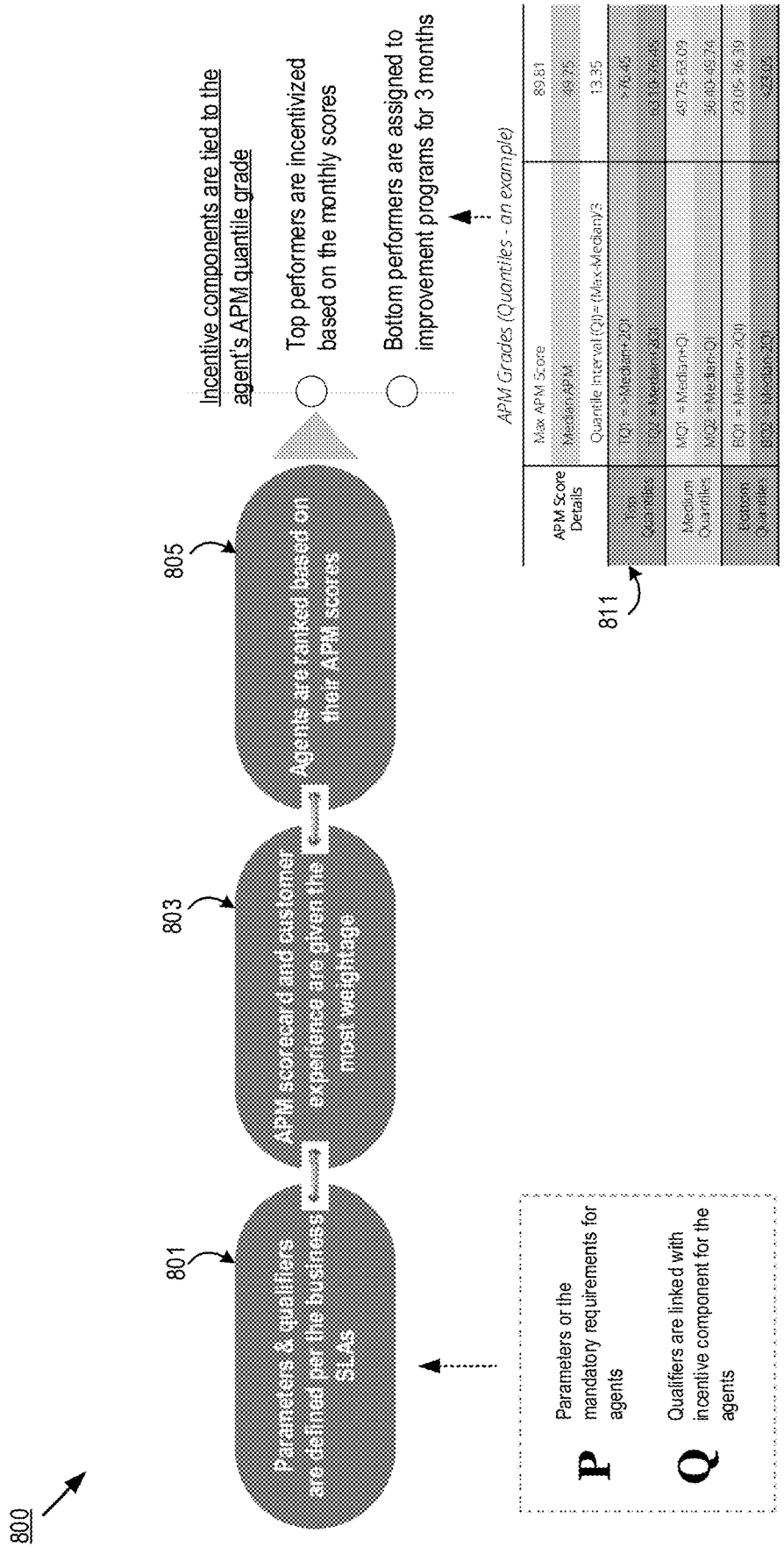
FIG. 8A is a schematic diagram of an example process for ranking agents in a contact center, according to embodiments of the disclosure.

FIG. 8A further illustrates an example process 800 for ranking agents in a contact center, according to embodiments of the disclosure. As illustrated, to rank the agents, in step 801, the parameters and qualifiers may be first defined based on the business SLAs. Here, the parameters may include mandatory requirements for agents in a contact center, and qualifiers may be linked with incentive components for the agents in the contact center. As previously described, the measurement criteria used for the agent performance measurement framework initiates a balance of measures to reflect the different kinds of performance expected from agents for optimal performance. Finding the right mix and balance is one of the keys to a successful incentive program. Here, the qualifiers can be defined to meet specific business needs and can fall into various categories such as behavior, activity adherence, human resource (HR)-based rules, company/team performance, and so on.

Next, the relevant agent activities are to be tracked, measured, and analyzed, for example, to get an APM score for each agent. As illustrated in step 803, the APM scorecard and the customer experience are given the most weightage. Here, the APM scorecard includes metrics that summarize the agent activities, as shown in table 711 in FIG. 7C, according to one example. The specific calculation process may be similar to the calculation of the agent performance scores described in FIG. 6.

In step 805, the agents are ranked based on their APM scores. For instance, each agent may have an APM score calculated based on the metrics-driven by the agent interaction activities, and thus have a corresponding position in the ranking. In some embodiments, the agents may be further separated into different groups based on the ranking, as illustrated in FIG. 8A. For instance, the agents may be classified into top quantiles (TQ), medium quantiles (MQ), and bottom quantiles (BQ) according to their APM scores, as illustrated in table 811. In some embodiments, each of the TQ, MQ, and BQ groups may be further divided into two subgroups, such as TQ1 and TQ2, MQ1 and MQ2, and BQ1 and BQ2. The specified values used for the classification of agents into groups and subgroups are also specified in table 811.

Figure 8B:
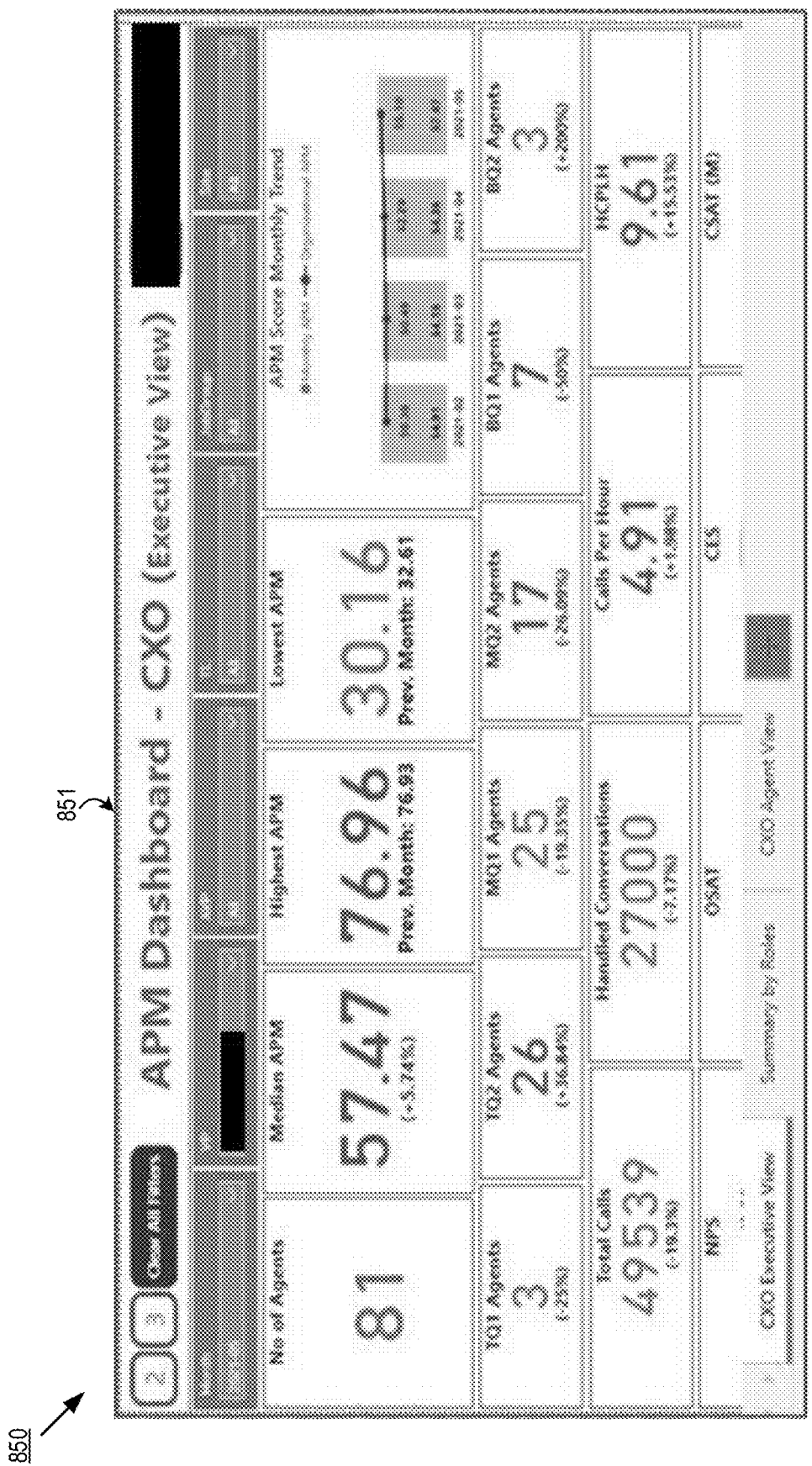
FIG. 8B illustrates an example snapshot from a user interface for monitoring agent classification, according to embodiments of the disclosure.

FIG. 8B illustrates an example snapshot 850 from a user interface 851 for monitoring agent classification, according to embodiments of the disclosure. As illustrated, for a total of 81 agents, 3 agents are classified into TQ1 subgroup, 26 agents are classified into TQ2 subgroup, 25 agents are classified into MQ1 subgroup, 17 agents are classified into MQ2 subgroup, 7 agents are classified into BQ1 subgroup, and 3 agents are classified into BQ2 subgroup. Certain other data for the contact center are also illustrated in the figure.

Referring back to FIG. 8A, in some embodiments, based on the classification, the agents may be offered different incentives to drive improved performance of the agents in a contact center. That is, the incentive components are tied to the agents' APM quantile grades. For instance, bottom performers (e.g., agented classified into BQ groups) may be assigned to improvement programs for three months. The specific programs may be designed based on certain metrics, which reflect areas that need improvements. On the other hand, the top performers may be incentivized based on their monthly scores. The overall goal of the agent performance measurement and the associated inventive programs is to improve superior agent experience that can in turn improve customer experience.

The other advantages for the disclosed agent performance measurement framework in agent performance measurement may include: 1) Balanced focus on productivity, effectiveness & VoC metrics. For instance, the agent performance measurement framework is a focused approach by bringing together efficiency and effectiveness metrics to derive a more balanced outcome measure to drive agent performance. In addition, the framework is robust and delivers a cumulative score to track and improve agent performance. 2) Analytics workbench rigor. For instance, KPIs are to be defined, benchmarked, and analyzed at the call reason/product level, which drives the right agent behavior and enables improved accuracy. In addition, KPIs are defined and analyzed at the channel/function level to drive the right agent behavior and enable greater accuracy and transparency in performance measurement. 3) Transformational opportunities. For instance, APM will help identify opportunities at the enterprise level and agent level to drive the reduction in cost and improvement in operational efficiency without compromising on agent behavioral qualities—through more targeted coaching and adoption of winning behaviors. 4) Improved management decisions. For instance, this APM framework will ultimately ensure that team leads, and managers measure what matters and thus increase the quality of information needed to make better data-driven decisions in the future. In addition, APM will help drive a more scientific approach to incentive planning while keeping accountability of KPIs in mind from agent level all the way to site level. The advantages of the disclosed agent performance measurement framework are further described in view of an actual application as illustrated in FIG. 9.

Figure 9:
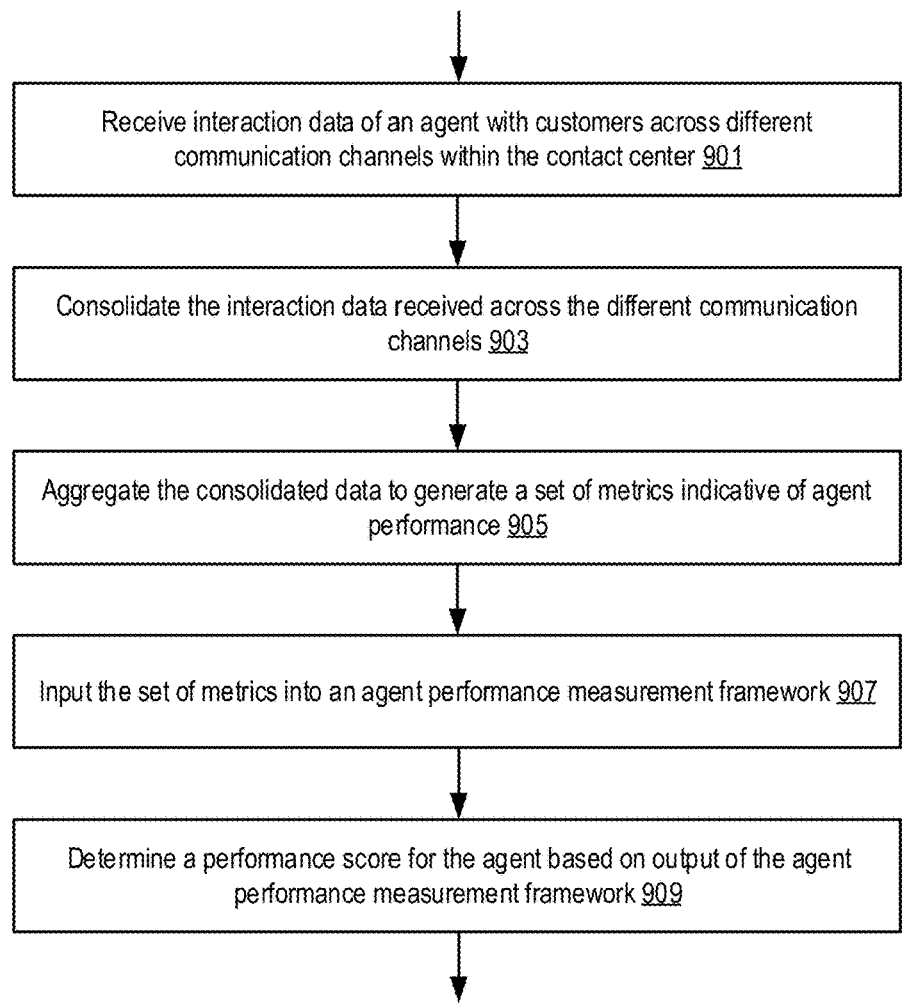
FIG. 9 is a flow chart of an example method for determining an agent performance score based on consolidated data, according to embodiments of the disclosure.

FIG. 9 is a flow chart of an example method for determining an agent performance score based on consolidated data, according to embodiments of the disclosure. In step 901, the interaction data for an agent with different customers are collected across different communication channels with a multi-channel contact center. Here, the data may include any user activities of the agent in interacting with customers, including in any communication channel. In some embodiments, the data may include other relevant data associated with the user activities, such as customer feedback for the agent, and the notes taken by the agent after customer interactions, etc.

In step 903, the collected data is collated and combined. That is, the data collected from different resources and communication channels are pooled together to form an agent-specific context. In some embodiments, the agent-specific content may also include the user profile of the agent, and any customer interactions from the agent, as previously described. In some embodiments, the combined data may be stored in a database associated with the agent, e.g., in a database of the contact center.

In step 905, the combined data is aggregated to generate a set of metrics indicative of agent performance. For instance, the combined data may be compiled and organized into a more consumable, more actionable and comprehensive medium. In some embodiments, the aggregated data may be further analyzed to generate a set of metrics indicating agent performance. This may include generating metrics for measuring the productivity, knowledge, sentiment, quality, and VoC of the agent. The specific process for identifying the specific metrics to be employed for performance measurement is described earlier in FIGS. 3-6 and are not repeated here.

In step 907, the metrics are input into the agent performance measurement framework to generate performance scores. Here, the agent performance measurement framework may be a platform for performance measurement, which is a dynamic platform that can be frequently updated and modified according to the business needs of the contact centers. For instance, the metrics that are to be taken by the framework may be different at different time points. In addition, the weights assigned to the specific metrics at different time points may be also different.

In step 911, performance score(s) is then determined based on the outcome of the agent performance measurement framework. The performance score(s) may include a single APM score for an overall measurement of the agent performance. In some embodiments, the APM score may be an accumulative score generated based on other performance scores. For instance, a productivity score, knowledge score, sentiment+quality score, and VoC score may be first generated for the agent-based on certain metrics. The APM score may be then generated based on the productivity score, knowledge score, sentiment+quality score, and VoC score. In some embodiments, the productivity score, knowledge score, sentiment+quality score, and VoC score may each have different weights, to allow the generated APM score to more accurately reflect the needs at the enterprise level.

Although not shown in FIG. 9, in some embodiments, the APM score may be generated for each agent included in the contact center. The agents are then ranked according to their APM scores, and/or further classified into different groups or subgroups. In some embodiments, the incentive components are tied to agents' APM scores and their classified groups, so as to improve superior agent experience that can, in turn, improve customer experience.

Figure 10:
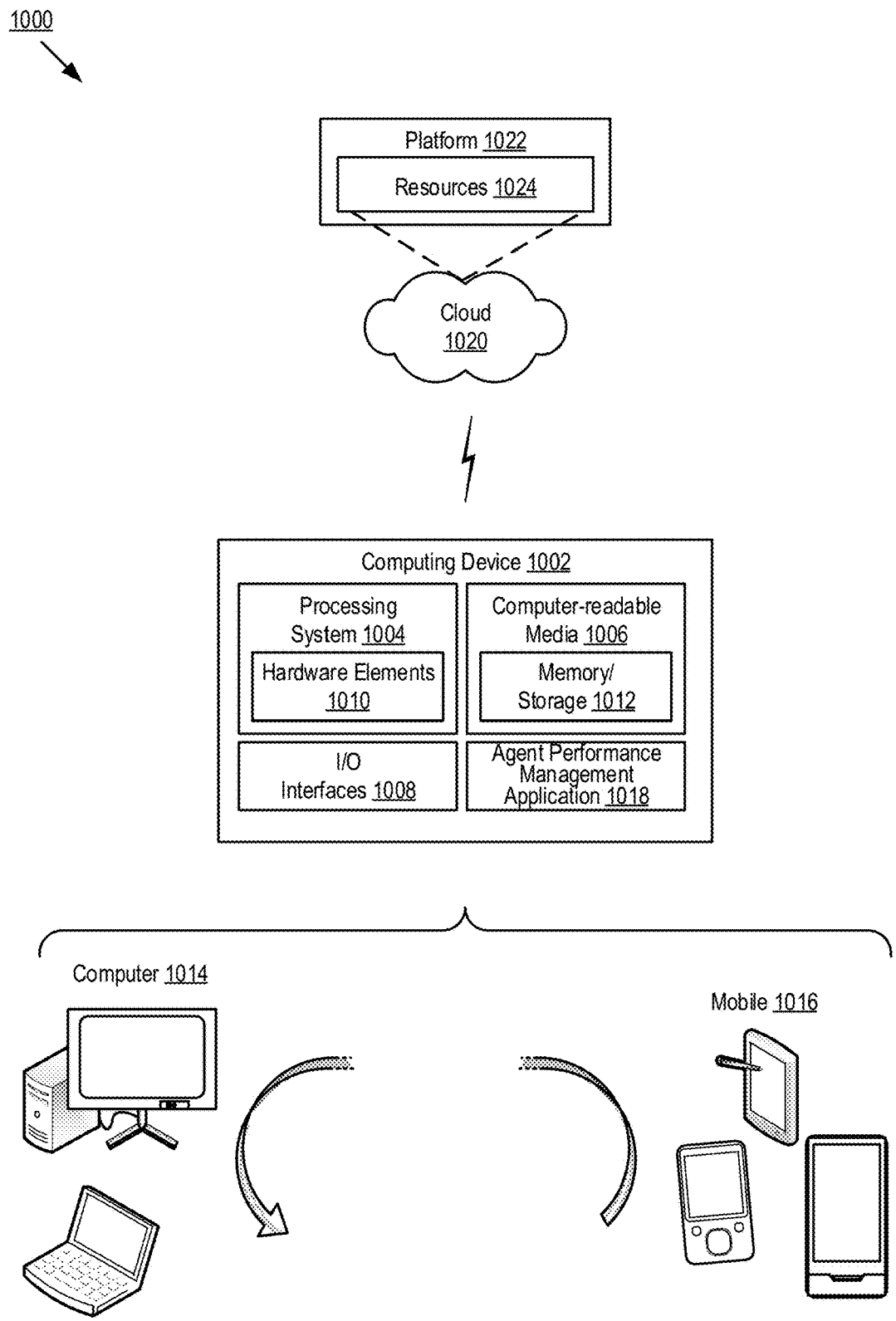
FIG. 10 is a functional block diagram of an example computer system upon which aspects of the disclosure may be implemented.

FIG. 10 illustrates an example system 1000 that, generally, includes an example computing device 1002 that is representative of one or more computing systems and/or devices that may implement the various techniques described herein. The computing device 1002 may be, for example, an end user device 103, an agent device 153, or a server or agent managing system (not shown in FIG. 1), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus may include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of the functionality to perform one or more operations using hardware. Accordingly, the processing system 1004 is illustrated as including hardware element 1010 that may be configured as processors, functional blocks, and so forth. This may include implementation in hardware as an application-specific integrated circuit (ASIC) or other logic devices formed using one or more semiconductors. The hardware elements 1010 are not limited by the materials from which they are formed, or the processing mechanisms employed therein. For example, processors may be comprised of semiconductor(s) and/or transistors, e.g., electronic integrated circuits (ICs). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random-access memory (RAM)) and/or nonvolatile media (such as read-only memory (ROM), Flash memory, optical disks, magnetic disks, and so forth). The memory/storage component 1012 may include fixed media (e.g., RAM, ROM, a fixed hard drive, and so on) as well as removable media, e.g., Flash memory, a removable hard drive, an optical disc, and so forth. The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movements as gestures that do not involve touch), and so forth. Examples of output devices include a display device (e.g., a monitor or projector), speakers, a printer, a network card, a tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media, and/or storage devices implemented in a method or technology suitable for storage of information such as computer-readable instructions, data structures, program modules, logic elements/circuits, or other data.

Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage devices, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer-readable instructions, data structures, program modules, or other data in a modulated data signal, such as carrier waves, data signals, or other transport mechanisms. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of modules, programmable device logic, and/or fixed device logic implemented in a hardware form that may be employed in one or more implementations to implement at least some aspects of the techniques described herein, such as to perform one or more instructions. Hardware may include components of an integrated circuit or on-chip system, an ASIC, a field-programmable gate array (FPGA), a complex programmable logic device (CPLD), and other implementations in silicon or other hardware. In this context, hardware may operate as a processing device that performs program tasks defined by instructions and/or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through the use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC) and/or a mobile device. Services and applications run substantially similar in these environments for a common user experience when transitioning from one device to the next while utilizing an application, chatting online, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created, and experiences are tailored to the generic class of devices. A class of devices may be defined by physical features, types of usage, or other common characteristics of the devices.

In various implementations, the computing device 1002 may assume a variety of different configurations, such as for computer 1014 and mobile 1016 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on.

The techniques described herein may be supported by these various configurations of the computing device 1002 and are not limited to the specific examples of the techniques described herein. This is illustrated through the inclusion of an agent performance management application 1018 on the computing device 1002, where the agent performance management application 1108 may include different units 109-147 as illustrated in FIG. 1. The functionality represented by the agent performance management application 1018 and other modules/applications may also be implemented all or in part through the use of a distributed system, such as over a "cloud" 1020 via a platform 1022 as described below.

The cloud 1020 includes and/or is representative of a platform 1022 for resources 1024. The platform 1022 abstracts the underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices 1014 or 1016. The platform 1022 may also serve to abstract scaling of resources to provide a corresponding level of scale to encountered demand for the resources 1024 that are implemented via the platform 1022. Accordingly, in an interconnected device implementation, implementation of functionality described herein may be distributed throughout the system 1000. For example, the functionality may be implemented in part on the computing device 1002 as well as via the platform 1022 that abstracts the functionality of the cloud 1020.

While this disclosure may contain many specifics, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Under certain circumstances, multitasking and parallel processing may be utilized. Moreover, the separation of various system components in the implementations described above should not be understood as requiring such separation in all implementations, and it should be understood that the described program components and systems may generally be integrated together in a single software or hardware product or packaged into multiple software or hardware products.

Some systems may use certain open-source frameworks for storing and analyzing big data in a distributed computing environment. Some systems may use cloud computing, which may enable ubiquitous, convenient, on-demand network access to a shared pool of configurable computing resources (e.g., networks, servers, storage, applications, and services) that may be rapidly provisioned and released with minimal management effort or service provider interaction.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A system for providing a data consolidation for improved customer communication and agent performance evaluation in a multi-channel contact center, the system comprising:
   a processor; and
   a memory, coupled to the processor, configured to store executable instructions that, when executed by the processor, cause the processor to:
   receive interaction data of an agent with customers across different communication channels within the contact center;
   consolidate the interaction data received across the different communication channels;
   aggregate the consolidated data to generate a set of metrics indicative of agent performance;
   input the set of metrics into an agent performance measurement framework;
   determine a performance score for the agent based on an output of the agent performance measurement framework;
   route a new interaction of a customer with the contact center to the agent based on the performance score determined for the agent;
   determine a personalized context of the customer based on previous interactions of the customer with the contact center; and
   automatically transmit the personalized context of the customer to the agent when the customer is routed to the agent, so that there is no disruption when the customer is moving from one communication channel or agent within the contact center to another communication channel or agent within the contact center.

2. The system of claim 1, wherein, to consolidate the interaction data received across the different communication channels, the executable instructions further include instructions that, when executed by the processor, cause the processor to:
   map a relationship of the interaction data received across the different communication channels, to allow the interaction data from the different communication channels to be comparable.

3. The system of claim 1, wherein, to aggregate the consolidated date, the executable instructions further include instructions that, when executed by the processor, cause the processor to:
   group the consolidated data into certain subsets through data segmentation, wherein different subsets of the consolidated data are used to determine different types of metrics.

4. The system of claim 1, wherein, to generate a set of metrics indicative of agent performance, the executable instructions further include instructions that, when executed by the processor, cause the processor to:
   generate subsets of metrics corresponding to productivity, quality, agent knowledge, and voice of customer (VoC).

5. The system of claim 4, wherein each of the subsets of metrics has different weights when the subset of metrics are input into the agent performance measurement framework to determining the agent performance score for the agent.

6. The system of claim 1, wherein the executable instructions further include instructions that, when executed by the processor, cause the processor to:
   determine performance scores for remaining agents within the contact center, wherein the remaining agents communicate with customers of the contact center through the different communication channels.

7. The system of claim 6, wherein the executable instructions further include instructions that, when executed by the processor, cause the processor to:
   rank agents included in the contact center based on the determined performance score for the agent and the performance scores for the remaining agents.

8. The system of claim 7, wherein the executable instructions further include instructions that, when executed by the processor, cause the processor to:
   provide different incentives to the agents included in the contact center based on the ranking.

9. The system of claim 1, wherein the executable instructions further include instructions that, when executed by the processor, cause the processor to:
   collect interaction data including the previous interactions of the customer with the contact center through the different communication channels; and
   aggregate the interaction data of the customer to generate the personalized context for the customer.

10. The system of claim 9, wherein the personalized context for the customer comprises personal information and interaction history of the customer with the contact center.

11. The system of claim 9, wherein the executable instructions further include instructions that, when executed by the processor, cause the processor to:
   automatically forward the personalized context of the customer to a device associated with the agent when the customer is assigned to the agent in interacting with the contact center.

12. The system of claim 1, wherein the executable instructions further include instructions that, when executed by the processor, cause the processor to:
   determine values for each of the set of metrics at different time points for the agent; and
   generate a trend for each metric of the set of metrics based on the values of the metric at different time points.

13. The system of claim 12, wherein the executable instructions further include instructions that, when executed by the processor, cause the processor to:
   identify coaching needs for the agent based on the generated trend for each of the set of metrics.

14. The system of claim 12, wherein the executable instructions further include instructions that, when executed by the processor, cause the processor to:
   identify improvement opportunities based on the generated trend for each of the set of metrics.

15. A method for providing a data consolidation for improved customer communication and agent performance evaluation in a multi-channel contact center, the method comprising:
   receiving interaction data of an agent with customers across different communication channels within the contact center;
   consolidating the interaction data received across the different communication channels;
   aggregating the consolidated data to generate a set of metrics indicative of agent performance;
   inputting the set of metrics into an agent performance measurement framework;
   determining a performance score for the agent based on an output of the agent performance measurement framework;
   routing a new interaction of a customer with the contact center to the agent based on the performance score determined for the agent;
   determining a personalized context of the customer based on previous interactions of the customer with the contact center; and
   automatically transmitting the personalized context of the customer to the agent when the customer is routed to the agent, so that there is no disruption when the customer is moving from one communication channel or agent within the contact center to another communication channel or agent within the contact center.

16. The method of claim 15, wherein consolidating the interaction data received across the different communication channels further comprises:
   mapping a relationship of the interaction data received across the different communication channels, to allow the interaction data from the different communication channels to be comparable.

17. The method of claim 15, wherein aggregating the consolidated data further comprises:
   grouping the consolidated data into certain subsets through data segmentation, wherein different subsets of the consolidated data are used to determine different types of metrics.

18. The method of claim 15, further comprising:
   collecting interaction data including the previous interactions of the customer with the contact center through the different communication channels; and
   aggregating the interaction data of the customer to generate the personalized context for the customer.

19. The method of claim 18, further comprising:
   automatically forwarding the personalized context of the customer to a device associated with the agent when the customer is assigned to the agent in interacting with the contact center.

20. A computer program product tangibly embodied in a non-transitory machine-readable storage medium, including instructions configured to cause a data processing apparatus to:
   receive interaction data of an agent with customers across different communication channels within a contact center;
   consolidate the interaction data received across the different communication channels;
   aggregate the consolidated data to generate a set of metrics indicative of agent performance;
   input the set of metrics into an agent performance measurement framework;
   determine a performance score for the agent based on an output of the agent performance measurement framework;
   route a new interaction of a customer with the contact center to the agent based on the performance score determined for the agent;
   determine a personalized context of the customer based on previous interactions of the customer with the contact center; and
   automatically transmit the personalized context of the customer to the agent when the customer is routed to the agent, so that there is no disruption when the customer is moving from one communication channel or agent within the contact center to another communication channel or agent within the contact center.

* * * * *